(12) United States Patent
Kobuss

(10) Patent No.: US 9,409,753 B2
(45) Date of Patent: Aug. 9, 2016

(54) TRANSPORT CARRIAGE FOR TRANSPORT OF A PATIENT SUPPORT AND/OR AN OPERATING TABLE COLUMN OF AN OPERATING TABLE

(71) Applicant: MAQUET GMBH, Rastatt (DE)

(72) Inventor: Matthias Kobuss, Gernsbach (DE)

(73) Assignee: MAQUET GMBH, Rastatt (DE)

( * ) Notice: Subject to any disclaimer, the term of this patent is extended or adjusted under 35 U.S.C. 154(b) by 0 days.

(21) Appl. No.: 14/072,298

(22) Filed: Nov. 5, 2013

(65) Prior Publication Data

US 2014/0130258 A1    May 15, 2014

(30) Foreign Application Priority Data

Nov. 9, 2012  (DE) .......................... 10 2012 110 755

(51) Int. Cl.
| | |
|---|---|
| *A47B 7/00* | (2006.01) |
| *B66F 9/065* | (2006.01) |
| *A61G 7/018* | (2006.01) |
| *A61G 7/08* | (2006.01) |
| *A61G 13/06* | (2006.01) |

(Continued)

(52) U.S. Cl.
CPC ................ *B66F 9/065* (2013.01); *A61G 7/018* (2013.01); *A61G 7/08* (2013.01); *A61G 13/06* (2013.01); *A61G 13/08* (2013.01); *A61G 13/104* (2013.01); *B62B 3/008* (2013.01); *A61G 7/012* (2013.01); *A61G 7/015* (2013.01)

(58) Field of Classification Search
CPC ........ A61G 7/012–7/08; A61G 13/06–13/104; B62B 3/008; B66F 9/065

USPC ................................ 5/600–620, 81.1 R–83.1
See application file for complete search history.

(56) References Cited

U.S. PATENT DOCUMENTS

| | | | |
|---|---|---|---|
| 4,667,354 A | * | 5/1987 | Carey et al. ........................ 5/614 |
| 5,103,530 A | | 4/1992 | Andrisin, III et al. |

(Continued)

FOREIGN PATENT DOCUMENTS

| | | |
|---|---|---|
| CN | 2409107 Y | 12/2000 |
| CN | 201389134 Y | 1/2010 |

(Continued)

OTHER PUBLICATIONS

Japanese Office Action translated in English for Application Serial No. 2013-214603 dated Jan. 21, 2015.

(Continued)

*Primary Examiner* — David E Sosnowski

(57) ABSTRACT

A transport carriage for transport of a patient support and/or an operating table column of an operating table includes a chassis which is connectable with the patient support and/or with the operating table column of the operating table. The chassis includes a first longitudinal beam and a second longitudinal beam arranged at a distance thereto. The first and second longitudinal beams form a fork-shaped opening. At least one castor which is pivotable about a swiveling axis is arranged at the longitudinal beams. The transport carriage includes at least one delimiting unit for delimiting the swiveling movement of at least one of the castors about its swiveling axis. The delimiting unit in a disabled first operational state does not delimit the swiveling movement of the at least one castor. In an enabled second operational state, the delimiting unit does delimit the swiveling movement of the castor.

20 Claims, 25 Drawing Sheets

(51) Int. Cl.
*A61G 13/08* (2006.01)
*A61G 13/10* (2006.01)
B62B 3/00 (2006.01)
*A61G 7/012* (2006.01)
*A61G 7/015* (2006.01)

(56) References Cited

U.S. PATENT DOCUMENTS

| | | | |
|---|---|---|---|
| 5,154,562 A | 10/1992 | Dornauer | |
| 6,854,140 B2* | 2/2005 | Bartels et al. | 5/601 |
| 7,181,791 B2 | 2/2007 | Clayton | |
| 7,412,311 B2* | 8/2008 | Georgi et al. | 701/23 |
| 7,814,591 B2* | 10/2010 | Weiler | 5/611 |
| 8,136,185 B2* | 3/2012 | Olszewski | 5/611 |
| 2008/0256709 A1* | 10/2008 | Weiler | 5/611 |
| 2009/0067963 A1* | 3/2009 | Olszewski | 414/349 |
| 2011/0030142 A1* | 2/2011 | Karwal et al. | 5/608 |
| 2011/0173753 A1* | 7/2011 | Luginbuhl et al. | 5/601 |
| 2012/0006960 A1* | 1/2012 | Ahlman | 248/309.1 |
| 2012/0233780 A1* | 9/2012 | Estrada et al. | 5/613 |

FOREIGN PATENT DOCUMENTS

| | | |
|---|---|---|
| DE | 1158663 B | 12/1963 |
| DE | 8815279 U1 | 1/1989 |
| DE | 4140885 C1 | 2/1993 |
| DE | 4309663 C1 | 4/1994 |
| DE | 4319525 A1 | 12/1994 |
| DE | 102007043431 A1 | 3/2009 |
| EP | 0410349 A2 | 1/1991 |
| EP | 0457247 A1 | 11/1991 |
| JP | S60-79423 A | 5/1985 |
| JP | S63-154027 A | 10/1988 |
| JP | H06-23002 A | 2/1994 |
| JP | H07-315006 A | 12/1995 |
| JP | 2005-521535 A | 7/2005 |
| JP | 2009-066407 A | 4/2009 |
| JP | 2010-000842 A | 1/2010 |

OTHER PUBLICATIONS

Chinese Office Action for Chinese Patent Application No. 201310551646.4 dated Aug. 4, 2015 and its English Translation.

* cited by examiner

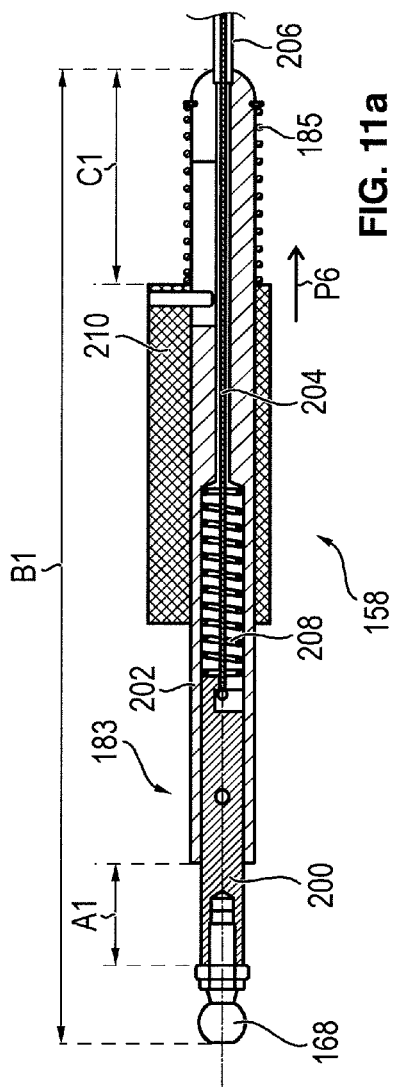
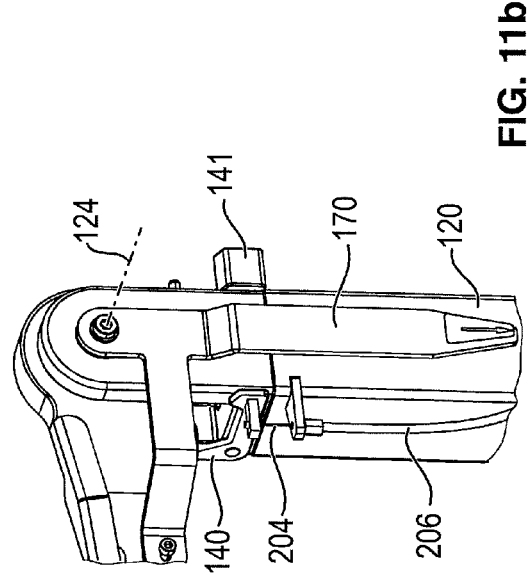
FIG. 11a
FIG. 11b

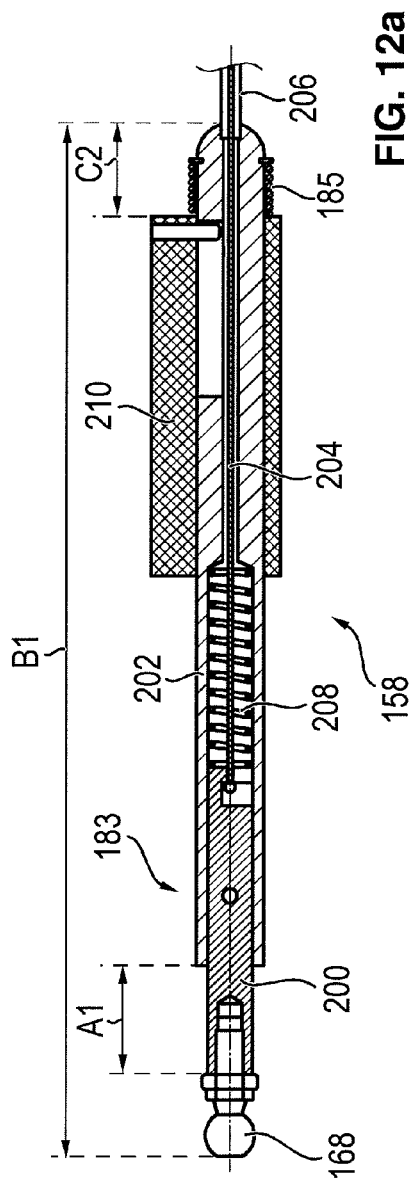
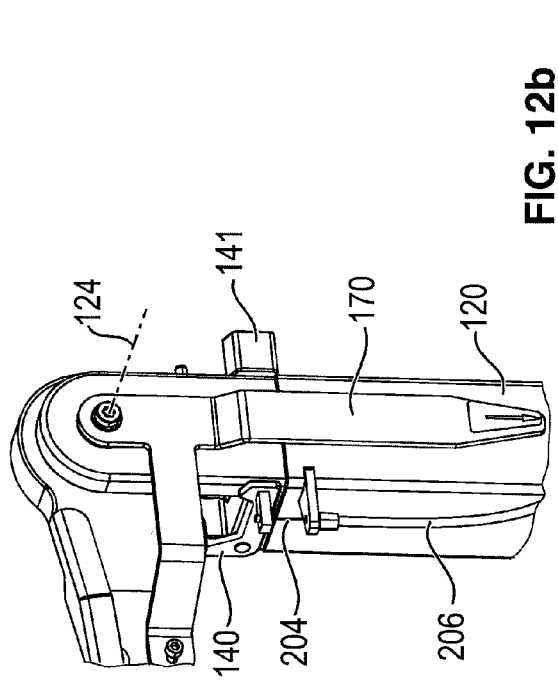
FIG. 12a
FIG. 12b

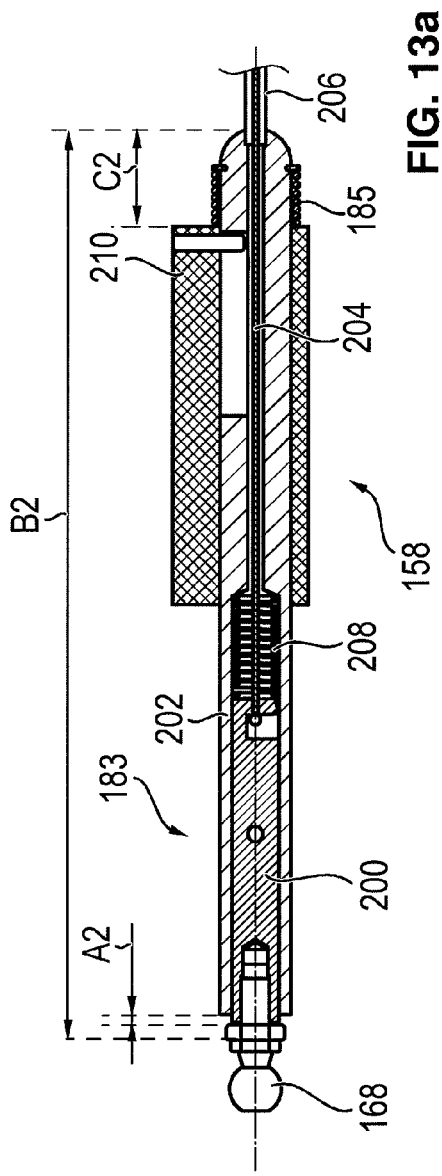
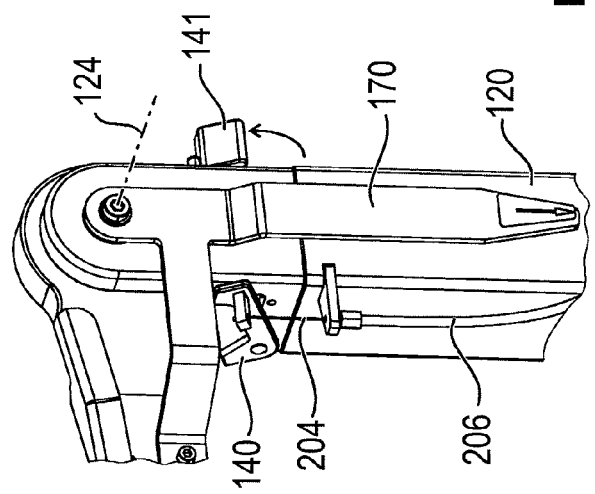
FIG. 13a
FIG. 13b

TRANSPORT CARRIAGE FOR TRANSPORT OF A PATIENT SUPPORT AND/OR AN OPERATING TABLE COLUMN OF AN OPERATING TABLE

CROSS REFERENCE TO RELATED APPLICATIONS

Applicant hereby claims foreign priority benefits under U.S.C. §119 from German Utility Model Application No. DE 10 2012 110 755.6 filed on Nov. 9, 2012, the contents of which are incorporated by reference herein.

TECHNICAL FIELD

The invention relates to a transport carriage for transport of a patient support and/or an operating table column of an operating table. Transport carriages are known comprising a chassis which is connectable with the patient support and/or with the operating table column of the operating table. The chassis comprises a first longitudinal beam and a second longitudinal beam arranged at a distance thereto. The first and second longitudinal beams define a fork-shaped opening. At least one steering roller swiveling about a swivel axis is arranged at each of the longitudinal beams which define the fork-shaped opening. Further, the invention relates to an arrangement comprising a patient support and/or an operating table column of an operating table as well as a transport carriage. Operating tables comprising a patient support which can be separated from an operating table column and, possibly, further components which can be coupled to the operating table column and/or the patient support are also referred to as operating table systems.

BACKGROUND

From document EP 0 410 349 B1 a transport carriage for operating table platforms is known wherein at least two transport rollers of the transport carriage are supported on their axes for slidable movement in the axial direction in order to allow for simple positioning of the transport carriage about an operating table column.

From document DE 41 40 885 C1 a transport carriage for operating table platforms is known having a tilting device and a hydraulic catch mechanism which is mechanically controlled.

From document DE 43 09 663 C1 a transport carriage for operating table platforms is known having four steering rollers and two guide rollers.

From document DE 88 15 279 U1 a device for transporting operating tables is known wherein at least one of the steering rollers is drivable by means of a drive.

From document DE 11 58 663 A1 a transport carriage for an operating table is known wherein the resting surface can be transferred from the transport carriage onto the operating table in an easy manner.

From document EP 0 457 247 B1 a transport carriage for transport of an operating table is known wherein a platform of the operating table or a support column whose length is adjustable by means of a lifting apparatus are selectively transportable together with the platform.

From document DE 10 2007 043 431 A1 a transport carriage for the patient support of an operating table is known comprising an integrated lifting apparatus for altering the height of a patient support coupled with the transport carriage wherein the orientation of the patient support remains unchanged during height adjustment.

SUMMARY

Known transport carriages serve for receiving a patient support with a patient resting on said support, prior to, during, and following an operation. The patient support can be coupled with an operating table column as one unit, and can be separated therefrom, so that the patient support can be transferred from the operating table column to the transport carriage and again from the transport carriage to the same or to another, equal operating table column. With the transport carriage, long distances are covered, e.g. in a hospital's surgery wing. Therefore it is important that the transport carriage is as easily maneuverable as possible and the forces required for moving the transport carriage with the patient support are as small as possible. Further, the total width of the transport carriage should be as small as possible, such that the transport carriage can be moved in an easy manner also through doors having the entrance widths typical for hospital.

In particular, when operating table columns of mobile operating tables have a wide base and when steering rollers are used on the transport carriage, collisions can occur when advancing the transport carriage over the operating table column and removing it therefrom, i.e. when the transport carriage is moved below the patient support such that the longitudinal beams of the transport carriage's chassis receive or surround an upright section of the operating table column, wherein subsequently the transport carriage is removed from the operating table column in the opposite direction. Due to the change of the moving direction of the transport carriage after transfer of the patient support, the steering rollers arranged at the longitudinal beams of the chassis swivel. Such steering rollers usually are undriven support wheels, capable of orienting autonomously with respect to the current chassis movement direction.

Steering rollers of various sizes are known on transport carriages for transport of patient supports. Conventional steering rollers comprise one or two running wheels which are connected with the longitudinal beams so as to be rotatable about a vertical swivel axis. What is essential for the function of said steering rollers is that the rotational axis of the running wheels or the running wheel, respectively, does not intersect the vertical swivel axis, but that they have a given mutual distance, also referred to as castor length, so that the rollers are dragged. Thus, the swivel axis and the rotational axis are skewed. Steering rollers of this type are also referred to as castors and are used, for example on office chairs, wheelchairs, shopping carts and baby buggies.

In order to avoid collisions between the operating table column and the transport carriage's steering rollers the base of the column can be formed correspondingly small. This is, however, detrimental to stability of the operating table column. Further, it is possible to realize the transport carriage correspondingly wide so as to prevent collisions between the steering rollers and the base of the operating table column. This is, however, detrimental to maneuverability and to the demands on the widths of doors and corridors.

For good maneuverability of a transport carriage for operating table columns and patient supports of operating tables, it is advantageous to provide four steering rollers, so that even lateral movement of the transport carriage and a patient support connected with the transport carriage and/or an operating table column connected with the transport carriage is possible. In order to reduce the rolling fraction and the thrust forces required for moving the transport carriage as well as to better overcome obstacles, steering rollers with running wheel diameters as large as possible are employed. Due to employment of large running wheel diameters, however, upon reversal of the movement direction of the transport carriage, collision and jamming of the steering rollers connected with the longitudinal beams of the transport carriage with an operating table column arranged between the longitudinal beams may occur, when the steering rollers swivel inward, i.e. in direction toward the base of the operating table column. A movement of the transport carriage away from the operating table column is rendered impossible thereby, or is possible only with very high expenditure of energy.

It is the object of the invention to specify transport carriage as well as an arrangement comprising a transport carriage and an operating table wherein a possible collision between the steering rollers of the transport carriage and an operating table column of the operating table is avoided in an easy manner.

This object is solved by a transport carriage for transport of a patient support and/or an operating table column of an operating table having the features of claim 1 and an arrangement having the features of the independent arrangement claim. Advantageous developments of the invention are specified in the dependent claims.

The transport carriage according to the invention comprises at least one delimiting unit for delimiting the swiveling movement of at least one of the steering rollers about the swivel axis thereof. In a disabled first operational state, the delimiting unit does not delimit the swiveling movement of the east least one steering roller. Hence, an unobstructed swiveling movement is possible in the first operational state. In an enabled second operational state, the delimiting unit does delimit the swiveling movement of the steering roller. In particular in the case of mobile operating tables where the operating table column has a large base required for reasons of stability of the operating table and where the swiveling range of the steering rollers can overlap within the area of the operating table column, with areas of the operating table column, in particular with the column base, this has the advantage that upon reversal of the movement direction, the delimiting unit prevents a swiveling movement in direction toward the operating table column or toward the base of the operating table column, respectively. In contrast to the enabled second operational state, a swiveling movement is freely possible in the disabled first operational state without any further measures.

It is particularly advantageous if, despite enabled second operational state, the swiveling movement is released again, i.e. is no longer delimited when the operating table column has been lifted to such an extent, or when a height adjustable operating table column has been retracted so far, respectively, that its distance from the floor is such that a collision between the running wheels and the operating table column can no longer occur, or when at least measures have been taken for engagement of connecting elements of the transport carriage with the operating table column. Thereby, the patient support, together with the operating table column, or alternatively the operating table column without patient support can be easily moved also laterally in any desired direction by means of the transport carriage.

In an advantageous embodiment of the invention, a first delimiting unit for delimiting the swiveling movement of the first steering roller is connected with the first longitudinal beam, and a second delimiting unit for delimiting the swiveling movement of the second steering roller is connected with the second longitudinal beam. Thereby, collisions of both steering rollers can be avoided in an easy manner so that easy handling of the transport carriage is possible.

The following explanations apply to both, embodiments comprising only one delimiting unit and embodiments comprising two delimiting units, wherein the advantageous further developments mentioned in the following correspondingly apply to the second delimiting unit.

It is advantageous if the delimiting unit comprises a contact element which is movable between a first position in the first operational state and a second position in the second operational state. In this connection, it can be intended that a straight line extending through the first position and the second position is parallel to the longitudinal axis of the longitudinal beam, or that the straight line is skew with respect to the longitudinal axis of the longitudinal beam, wherein the straight line and the longitudinal axis in a projection in the plan view of the transport carriage enclose an acute angle. This angle preferably is an angle within the range of $0.5°$ to $10°$, in particular an angle within the range of $2°$ to $8°$, for example an angle of $5°$. Thereby, of a due to a direction of movement of the transport carriage in direction toward the longitudinal axis of a longitudinal beam caused orientation of the steering roller, the latter can be deflected obliquely outward, i.e. away from the fork-shaped opening.

As an alternative, or in addition to this further development, the contact element can have a greater lateral distance to a perpendicular plane through which the longitudinal axis of the longitudinal beam extends or to a perpendicular central plane of the transport carriage that is parallel to the longitudinal axis of the longitudinal beam in the second position than in the first position. Thus, the movement of the contact element is directed obliquely outward, whereby the rear part of the steering roller is pushed outward. This way, upon reversal of the direction of movement of the transport carriage, i.e. upon withdrawal of the transport carriage away from the operating table column or upon removal of the transport carriage from the operating table column, the steering roller contacted in such a manner by the contact element can swivel only outwardly so that there is no risk of the steering roller colliding with the operating table column, in particular with the base of the operating table column.

In a further development of the invention, the contact element for delimiting the swiveling movement of the steering roller in the second operational state laterally contacts a running wheel of the steering roller and/or a lateral cover of the steering roller's running wheel. This way, it can be achieved that no or only small friction occurs between the contact element and the steering roller upon movement of the transport wheel when the delimiting unit is in a delimiting position in the second operational state. Further, outward deflection of the steering roller, i.e. away from the fork-shaped opening, can be achieved through the lateral contact, when a force is applied to the inner side of the running wheel and/or an inner side cover of the steering roller's running wheel when contact is made. In this case, the inner side of the running wheel or the inner cover is the side of the running wheel facing the fork-shaped opening, or the cover facing the fork-shaped opening, respectively.

It is particularly advantageous if the steering rollers, thanks to their capability of rotating about the swivel axis, autonomously orientate in accordance with the current direction of movement of the transport carriage. The running wheel's rotating axis and the swivel axis are skew to each other. The horizontal distance between the running wheel's rotating axis and the swivel axis is referred as castor length. Preferably, the steering rollers are not driven. In particular, all rollers of the transport carriage are not driven. Preferably, the transport carriage is pushed by a person. The steering rollers are also referred to as castors. Steering rollers of this type are available at low cost in various designs so that standard rollers can be used for the transport carriage according to the invention. Thus, cost efficient, proven and tested technology can be used.

Further, it is advantageous if the contact element deflects the castor's running wheel upon movement from the first into the second position following an orientation of the castor's running wheel caused by movement of the transport carriage in the direction of a free end of the longitudinal beam along the longitudinal axis thereof. This occurs preferably in such a manner that the roll direction of the running wheel intersects the perpendicular center plane of the transport carriage extending between the longitudinal axes of the longitudinal beams in an angle falling into the range of 0.5° to 10°, in particular into a range of 1° to 7°, for example in an angle of 5°. Therein, the perpendicular center plane of the transport carriage preferably is parallel to a perpendicular plane in which the longitudinal axis extends, wherein the rotational axis of the castor is orthogonal to these two perpendicular planes in the orientation described. In this way, a simple structure of the transport carriage is achieved.

Further, it is advantageous if the delimiting unit is formed and/or arranged such that a change of the operational state of the delimiting unit from the first operational state into the second operational state occurs upon contact of the delimiting unit with an operating table column located between the longitudinal beams. This way, the operational state can change in easy manner without requiring any operator intervention.

In this connection, it is particularly advantageous if upon contact between the operating table column and the transport carriage an engaging element of the delimiting unit shifts the position of a guiding element connected with the contact element along a straight line. This straight line preferably extends parallel or in a horizontal plane oblique to the center plane of the transport carriage extending between the longitudinal beams. When the straight line is oblique to the center plane it intersects the center plane in an angle within the range of 0.5° to 10°, in particular in an angle within the range of 1° to 7°, for example in an angle of 5°.

In another advantageous further development, the contact element is pivot-mounted such that it performs a rotary movement upon contact with the castor's running wheel and upon a rotary movement of the running wheel. Thereby, the braking force upon contact of the contact element with the running wheel is considerably reduced since only little rolling friction occurs between the running wheel and the contact element and no or only little sliding friction occurs upon a rotary movement of the running wheel. This way, the transport carriage can be moved in an easier manner and the contact element and the running wheel suffer less wear.

Further, it is advantageous if the chassis comprises connecting elements for selectively establishing a connection with the patient support and the operating table column. The connecting elements are arranged at a distance above the longitudinal beams of the chassis. Preferably, the chassis has a first interface for connecting the transport carriage with the operating table column and a second interface for connecting the transport carriage with the patient support. Therein, the first interface and the second interface may be used alternatively or, in an alternative embodiment, simultaneously. When the transport carriage is connected with an operating table column on which a patent support is arranged, the operating table consisting of operating table column and patient support can be transported as a unit thanks to a connection between the transport carriage's chassis and the operating table column. Typical operating tables comprise an operating table head which is to be assigned either to the patient support or to the operating table column, such that the operating table head, depending on the design of the operating table, forms part of the patient support and is separated from the column together with the patient support when the patient support is separated from the operating table column, or in other embodiments, wherein the operating table head forms part of the operating table column, remains with the operating table column when the patient support is separated therefrom. This way, easy handling of the patient support and the operating table column in connection with the transport carriage is possible.

It is particularly advantageous if the chassis comprises a lifting device, preferably a hydraulic mechanical and/or electrical lifting and lowering unit for varying the distance of the connecting elements with respect to the longitudinal beams and/or a tilting device, preferably a hydraulic mechanical and/or electrical tilt adjusting device for adjusting the tilt of the connecting elements, such that in particular the tilt of the patient support can be varied. This way, a tilting of the patient support can be procured also for placing a patient resting on the patient support into shock position.

Further, it is advantageous if the transport carriage has two further castors which are connected with the chassis, preferably with the longitudinal beam and/or if at least one lowerable, non pivotable guiding roller is connected with the chassis. This allows for easy handling of the transport carriage. Provision of four swiveling castors allows for movement of the transport carriage in any desired direction, such that the transport carriage can easily be maneuvered. In the lowered state, the at least one lowerable guiding roller allows for good directional stability so that the transport carriage can be easily moved also over longer straight distances. If it is not lowered, the guiding roller does not contact the floor such that it does not affect the movement of the transport carriage. It is particularly advantageous if the lowerable, non pivotable guiding roller is arranged along the longitudinal axis of a beam between two castors arranged at a distance to the guiding roller. This allows for particularly easy handling, especially particularly easy steering of the transport carriage.

It is particularly advantageous if at least two castors connected with the chassis or two non pivotable guiding rollers connected with the chassis are coupled with a braking unit by means of which braking force can be applied to the running wheels of said castors. Thus, easy blocking of the transport carriage is possible so that secure handling of the transport carriage is achieved and dangerous situations can be avoided.

Further, it is advantageous if the delimiting unit comprises a first elastically deformable element which, in the second operational state, applies a force to the contact element or to a guiding element connected with the contact element. By means of said force, the contact element is in particular movable from its position assumed in the second operational state into its position assumed in the first operation state. In particular, the guiding element is returned to its position assumed in the first operation state by means of this force.

As an alternative or in addition to the elastically deformable element, the delimiting unit can comprise a second elastically deformable element which, in the enabled second operational state applies a force to the contact element upon deformation, wherein in the enabled second operational state, the contact element is movable by means of an actuating element from a delimiting position where the swiveling movement of the castor is delimited into a release position where the swiveling movement of the castor is not delimited, in counteraction to the force caused by the deformation. This way, delimiting of the swiveling movement can be terminated even if the delimiting unit is in the second operational state, i.e. in particular even if an operating table column is present in the area of the fork-shaped opening so that the second operational state preferably is automatically established when the operating table column is inserted in the fork-shaped opening of the transport carriage, a release of the castor's swiveling movement occurs. Deformation of the elastically deformable element preferable occurs also if, due to a corresponding inclination of the castor's running wheel, the contact element contacts the running wheel's running surface and cannot assume a position adjacent to the running wheel. The first and/or the second elastically deformable element preferably is an elastomer block or a spring, in particular a helical spring.

It is particularly advantageous if the actuating element is coupled with a connecting element for connecting the transport carriage with an operating table column in such a way that it moves the contact element from the delimiting position into the releasing position when the operating table column is connected with the transport carriage despite the enabled second operational state. This may be effected, for example by means of a Bowden cable coupled with the connecting element. In particular, when the transport carriage is connected to the operating table column via the connecting element, the core of the Bowden cable is pulled out of the Bowden cable sheath, wherein the opposite end of the core is directly or indirectly coupled with the contact element and pulls the latter in direction toward the elastically deformable element so that the latter is elastically deformed. If a plurality of delimiting units is provided, a Bowden cable is provided for each delimiting unit, each Bowden cable engaging one or one connecting element for connecting the transport carriage with the operating table column, so that the Bowden cable cores in a coupling position of the connecting elements are pulled out of the Bowden cable sheath by a length on the connecting element side, as compared to the uncoupled position.

Further it is advantageous if a guiding element connected with the contact element has a first part and a second part which are movable opposite to each other along their common longitudinal axis, wherein movement of the first part in direction toward the second part and/or movement of the first part into the second part causes an elastic deformation of the second elastically deformable element. This way, a simple mechanical structure can be achieved, by means of which a change of the position of the contact element from the delimiting position into the release position is possible despite the enabled second operational state.

It is further advantageous if the first and the second part form a cylinder wherein the first part has a cylinder aperture in which the second elastically deformable element is received and into which part of the second part is insertable. Doing so, a deformation of the second elastically deformable element occurs. Due to the force generated by the deformation, the second part is pushed out of the first part upon insertion of the second part, at least if no counterforce acts on the second part. Thereby, a simple, robust and compact structure of an arrangement for changing the position of the contact element from a delimiting position into a release position is disclosed.

BRIEF DESCRIPTION OF THE DRAWINGS

Further features and advantages of the invention result from the following description which in connection with the enclosed Figures explains the invention in more detail with reference to embodiments.

FIG. 11a shows a sectional view of the delimiting unit in the first operational state.

FIG. 11b shows a detail of the transport carriage with connecting elements for connecting the transport carriage with the operating table column in a position in which they do not engage the operating table column.

FIG. 12a shows a sectional view of the delimiting unit according FIG. 11a in the second operational state.

FIG. 12b shows a detail of the transport carriage with connecting elements for connecting the transport carriage with the operating table column in a position in which they do not engage the operating table column.

FIG. 13a shows a sectional view of the delimiting unit according to FIGS. 11a and 12a in the second operational state, wherein the delimiting unit in addition has been moved to a release position.

FIG. 13b shows connecting elements for connecting the transport carriage with an operating table column in an engagement position in which they can be brought into engagement with the operating table column, wherein upon engagement of the connecting elements and the operating column, the delimiting unit has been moved from a delimiting position into a release position.

DETAILED DESCRIPTION OF THE PREFERRED EMBODIMENT

Figure 1:
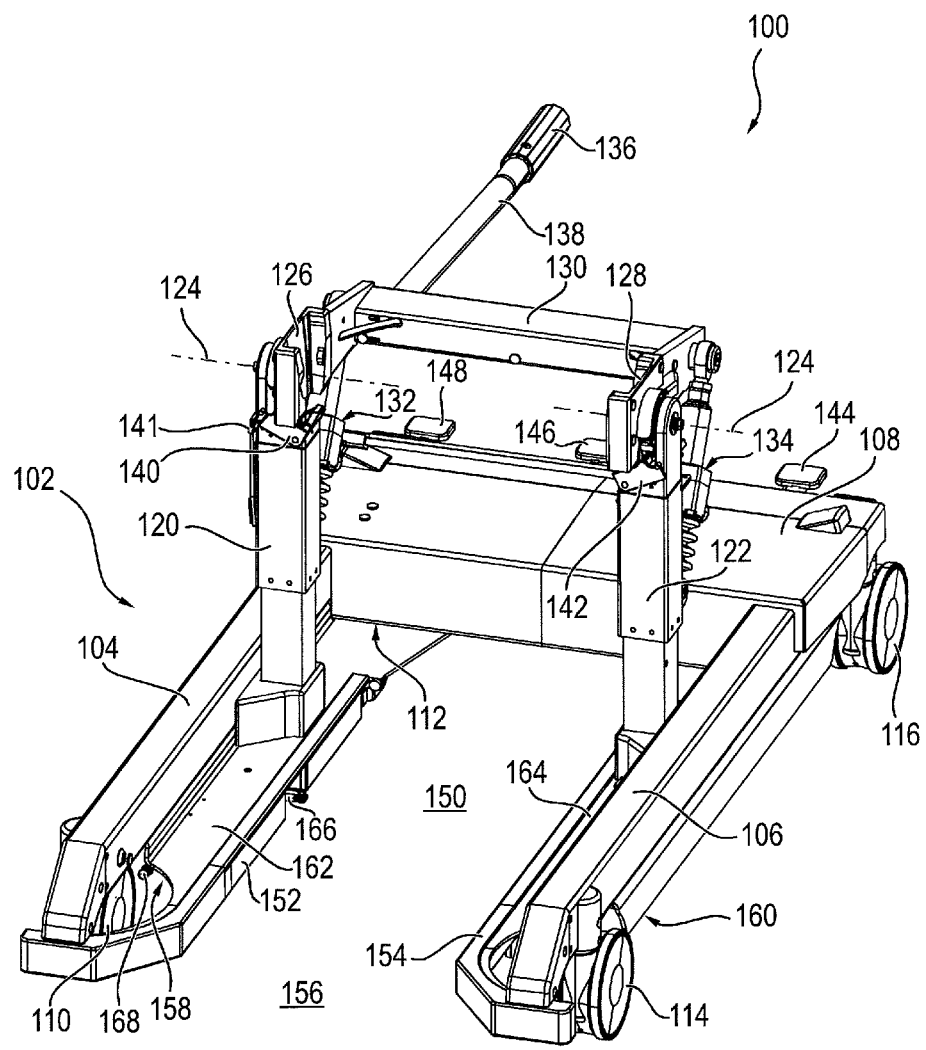
FIG. 1 shows a perspective front view of a transport carriage for transport of an operating table column and/or a patient support of an operating table according to a first embodiment.

FIG. 1 shows a perspective front view of a transport carriage 100 for transport of an operating table column and/or a patient support of an operating table according to a first embodiment. The transport carriage 100 comprises a chassis, generally referred to by 102, having two longitudinal beams 104, 106 and one crossbeam 108 connecting the rear ends of the longitudinal beams 104, 106. At the ends of the longitudinal beams 104, 106 castors 110 to 116 are arranged, each being connected with the longitudinal beams 104, 106 so as to be rotatable about a perpendicular swiveling axis. The rotational axis running wheels of the castors 110 to 116 lie in a horizontal plane and are spaced from the respective perpendicular swiveling axis such that upon movement of the transport carriage 100 they orientate in accordance with the movement direction thereof.

The chassis 102 comprises a first height-adjustable perpendicular support 120 whose lower end is fixedly connected with the longitudinal beam 104. Further, the chassis 102 comprises a second height-adjustable perpendicular support 122 whose lower end is fixedly connected with the second longitudinal beam 106. At the upper ends of the perpendicular supports 120, 122, connecting elements 126, 128 are connected that are pivotable about a pivot axis 124 and serve for connecting the transport carriage 100 with the patient support of an operating table. The connecting elements 126, 128 are rigidly connected with each other via a coupling element 130 such that, for tilting the patient support, they are rotatable about the pivot axis 124 only together. The tilt is adjusted by means of mechanical transmissions 132, 134 which are actuated via a rotary handle 136 provided at the end of a push rod 138 of the transport carriage 100. Inside the perpendicular supports 120, 122 further, not shown hydraulic units are arranged by means of which the length of the perpendicular supports 120, 122, and thus the height of the connecting elements 126, 128 for connecting the transport carriage 100 with the patient support of an operating table as well as the height of the connecting elements 140, 142 or coupling the transport carriage 100 with the operating table column of an operating table can be adjusted regarding the height above the floor on which the transport carriage 100 stands can be adjusted. A foot pedal 144 is connected with a hydraulic pump for actuation of the hydraulic pump for the hydraulic units arranged in the perpendicular supports 120, 122. A further foot pedal 146 serves for the actuation of brakes integrated in the castors 110, 116 such that the castors 110 to 116 can be locked or blocked when the foot pedal 146 is actuated. A further foot pedal 148 serves for lowering and lifting of a guiding wheel, or a track wheel arranged at the longitudinal beams 104, 106 and being located between the front castor 110 and the rear castor 112.

The longitudinal beams 104, 106 are arranged spaced from one another in a horizontal plane and define a fork-shaped opening 150 in which an operating table column can be arranged for receiving and/or transferring a patient support as well as for transport of an operating table column with or without patient support. For this purpose, the transport carriage 100 is moved below the operating table in such a way that the operating table column is located between guiding elements 152, 154 connected with the longitudinal beams 104, 106. For easy positioning of the transport carriage 100 with respect to the static mobile operating table column, the above-mentioned guiding wheel is preferably lifted from the floor such that the transport carriage 100 is easily movable in any desired direction by means of the four castors 110 to 116. Insertion of the operating table column into the fork-shaped opening 150 of the transport carriage is facilitated by means of the cone-shaped opening 156 formed by the guiding elements 152, 154.

Mobile operating table columns, i.e. operating table columns which are not fixedly mounted in a seat in the operating room floor, are provided with a large base for ensuring stability, said base extending under the guiding elements 152, 154 and extending at least partly into the possible swiveling range of the castors 110, 114, such that the castors 110, 114 might collide with the operating base upon a reversal of the movement direction after transfer of the patient support platform, when they swivel inward, i.e. toward the fork-shaped opening 150. Due to such a collision, removal of the transport carriage 100 from the operating table column becomes difficult, if not impossible. If a patient is resting on the patient support at that time, major problems might arise in this case, as the castors 110 114 must be rotated outward manually under the load of the patient's and the patient support's weight. In order to prevent the castors from swiveling inside, according to the invention a delimiting unit 158, 160 is provided for each of the front castors 110, 114 that is arranged below cover plates 162, 164 which connect the guiding element 152, 154 with the respective longitudinal beam. A first engaging element 166 and a contact element 168 of the delimiting unit 158 are visible in FIG. 1. Structure and function of these delimiting units 158, 160 is explained in more detail below in connection with the further FIGS. 2 to 16b.

Figure 2:
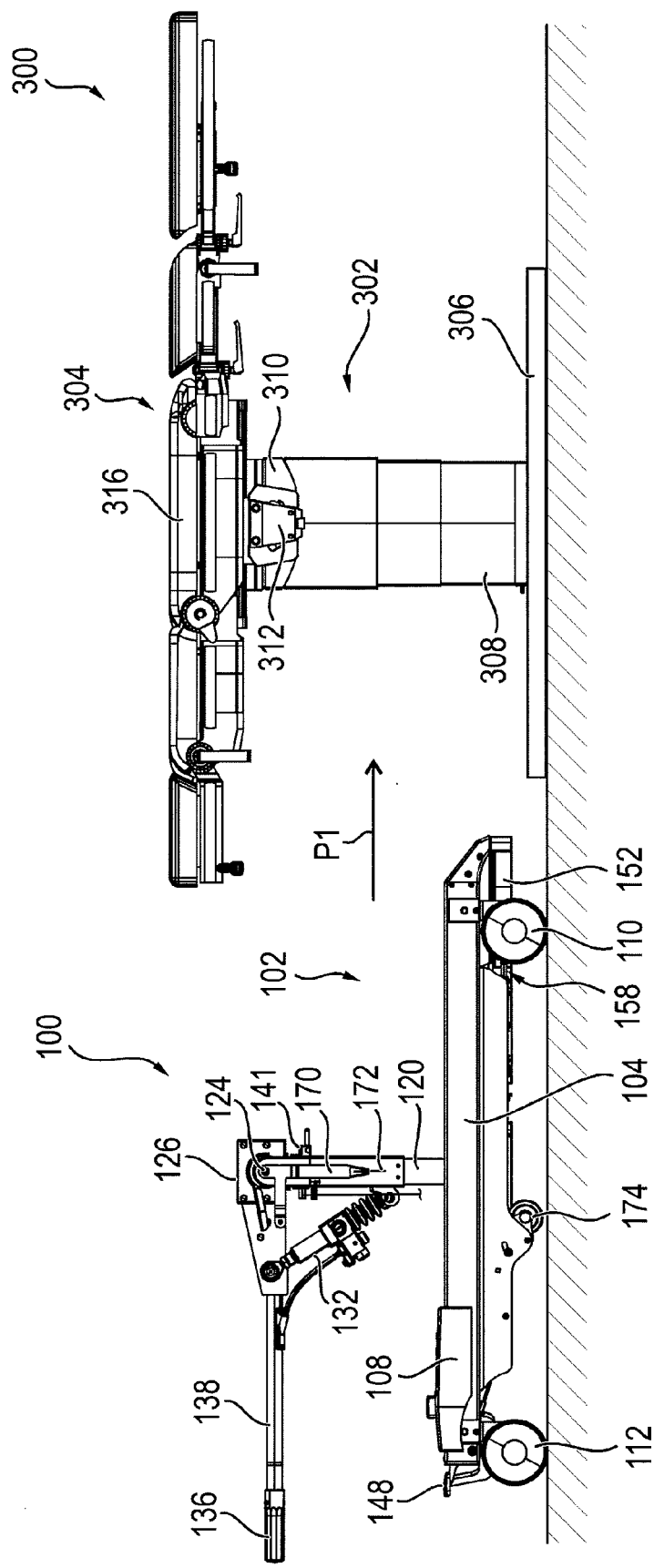
FIG. 2 shows a side view of the transport carriage according to FIG. 1 and an operating table before transfer of the patient support of the operating table to the transport carriage.

FIG. 2 shows a side view of the transport carriage 100 according to FIG. 1 and an operating table 300 prior to transfer of the patient support 304 of the operating table 300 to the transport carriage 100. In FIG. 2, a lowerable guiding wheel 174 is visible which is arranged at the first longitudinal beam 104 and is shown in the not lowered condition. The operating table 300 comprises the patient support and an operating table column 302 designated by 302. In the present embodiment, the operating table column 302 comprises an operating table base 306, a telescopic support 308 and a head module 310 provided for tilting and canting of the entire patient support 304. A central middle section of the patient support 304 is designated by 316.

Figure 3:
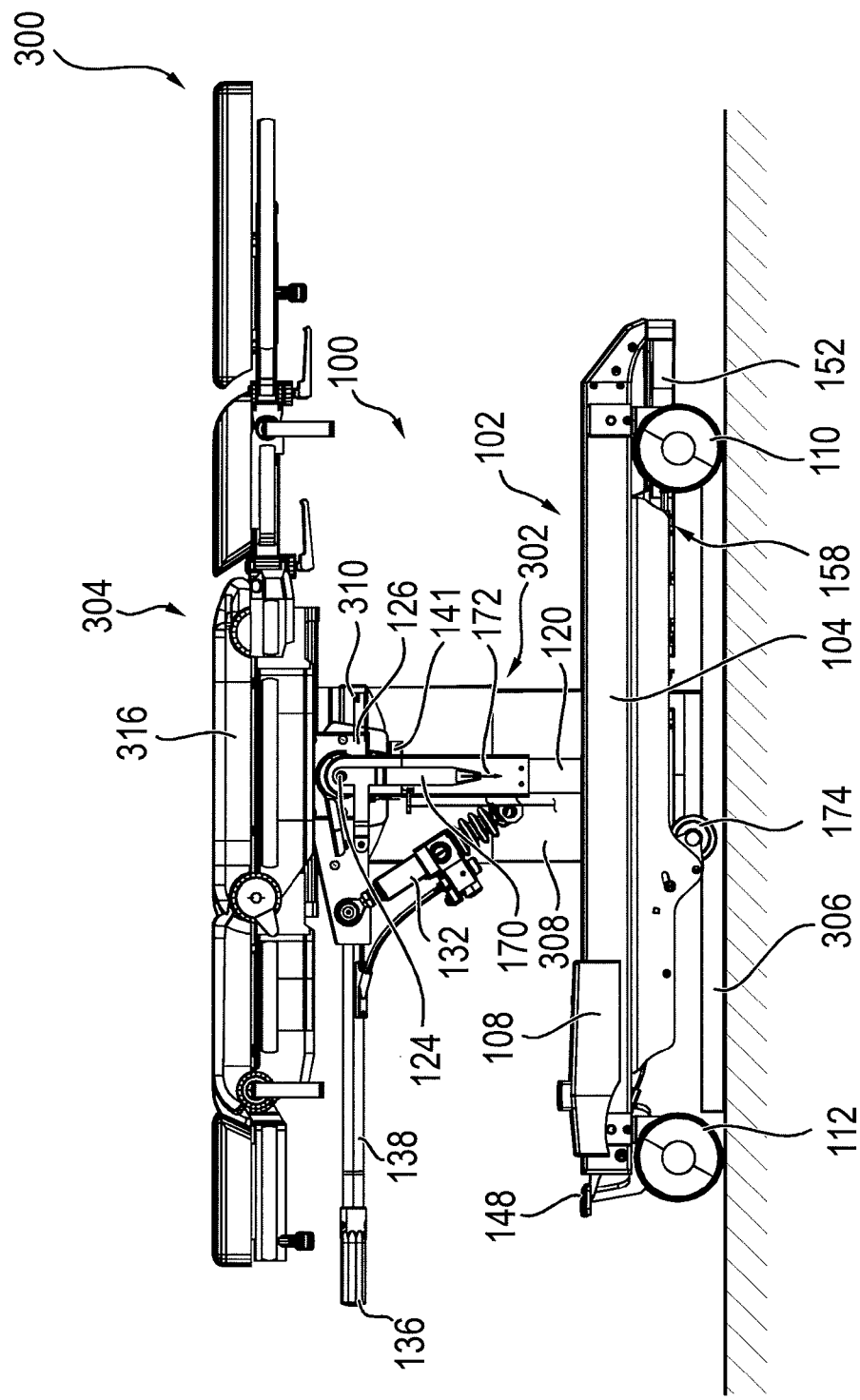
FIG. 3 shows the transport carriage and the operating table according to FIG. 2 in a transfer position.

As mentioned above, it is possible to selectively separate the patient support 304 from the operating table column 302 and transfer it to the transport carriage 100 by means of the transport carriage 100 or, alternatively, to transport the operating table column 302 together with the patient support 304 with the transport carriage 100. For transfer of the patient support 304, the transport carriage 100 is moved in direction of the arrow P1 such that the operating table column 302 is inserted into the fork-shaped opening 150 of the transport carriage 100, wherein the longitudinal beams 104, 106 laterally surround the telescopic support 308 of the operating table 300. This condition is shown in FIG. 3. Further, the patient support 304 has been moved downward in FIG. 3 by shortening the telescopic support 308 such that the connecting elements 312 provided at the patient support 304 are securely connected with the connecting elements 126, 128 of the transport carriage 100. Alternatively, it is possible to extend the height-adjustable supports 120, 122 such that the connecting elements 126, 128 of the transport carriage 100 engage with the connecting elements 312 of the patient support 304.

For easy and correct connection upon transfer of the patient support 304 to the transport carriage 100 and upon transfer of the patient support 304 from the transport carriage 100 to the operating table column 302, the connecting elements 126, 128, 312 must be correctly aligned with respect to one another. In the present embodiment, this applies when the central middle section 316 of the patient support 304 is oriented horizontally and a needle 170 which is mounted for rotation with the connecting element 126 points to a mark 172 provided on the perpendicular support 120. In other embodiments, the patient support 304 may have another tilt for transfer.

After the telescopic support 308 of the operating table column 302 has been lowered so far that the patient support 304 is connected with the transport carriage 100, it is further lowered until the head module 310 does no longer contact the patient support 304 and the patient support 304 can be easily removed from the operating table column 302 by moving the transport carriage 100.

Figure 4:
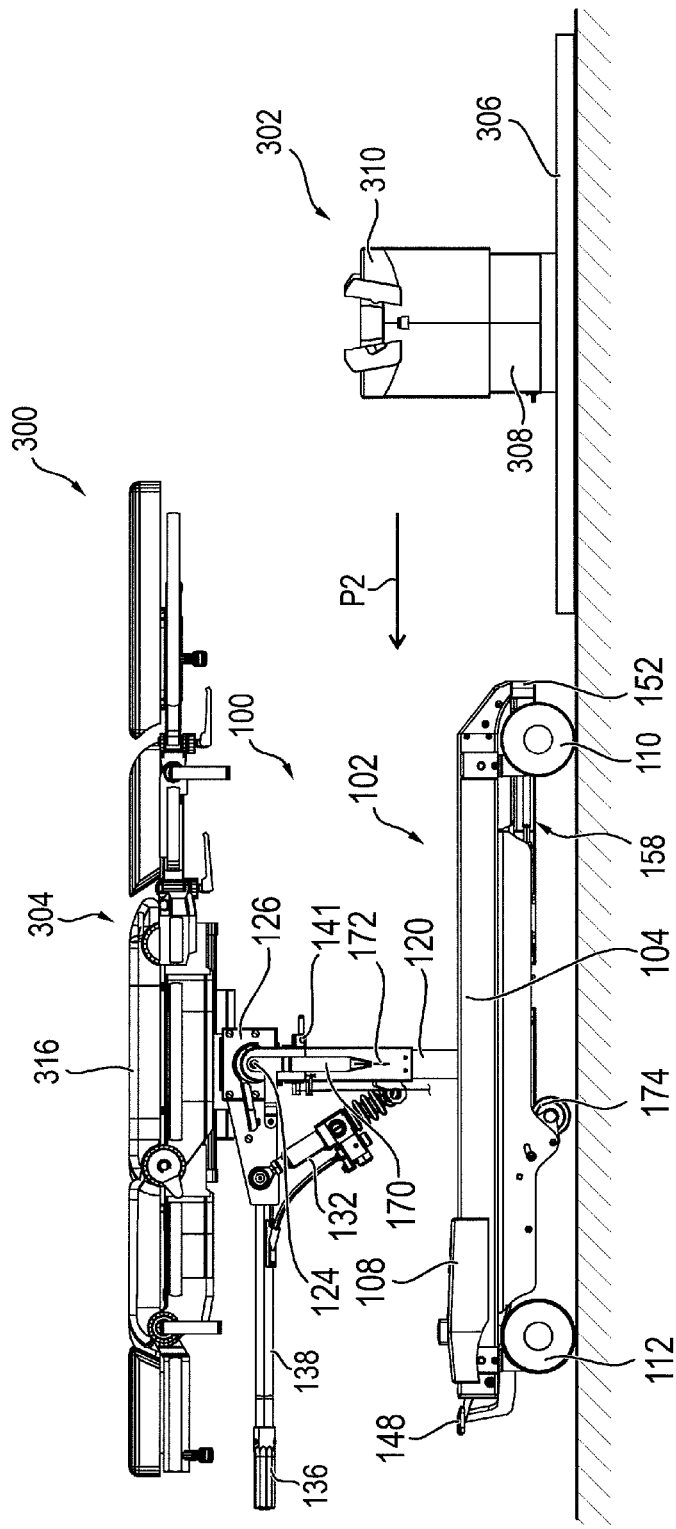
FIG. 4 shows the transport carriage, the operating table column, and the patient support after transfer of the patient support to the transport carriage.

In FIG. 4, the transport carriage 100, the operating table column 302, and the patient support 304 are shown after transfer of the patient support 304 to the transport carriage 100. Thereby, a patient resting on the patient support 304 can easily be transported by means of the transport carriage while resting on the patient support 304. Another patient support of the same type can subsequently be transferred to the operating table column 302. This is preferably transferred to the operating table column by means of the transport carriage 100.

Due to the height-adjustment of the supports 120, 122 the height of the patient support 304 can be set such that a patient may simply get off the patient support, with his/her feet easily reaching the floor. Alternatively, the patient support 304 can be brought to a suitable height for transfer of the patient to another treatment table, as for example an x-ray table, or to the height of a patient bed to which the patient is to be moved from the patient support 304.

In the present embodiment, the transport carriage 100 comprises only one guiding wheel 174. In other embodiments, the transport carriage is provided with at least one lowerable guiding wheel 174 on each of the longitudinal beams 104, 106.

Figure 5:
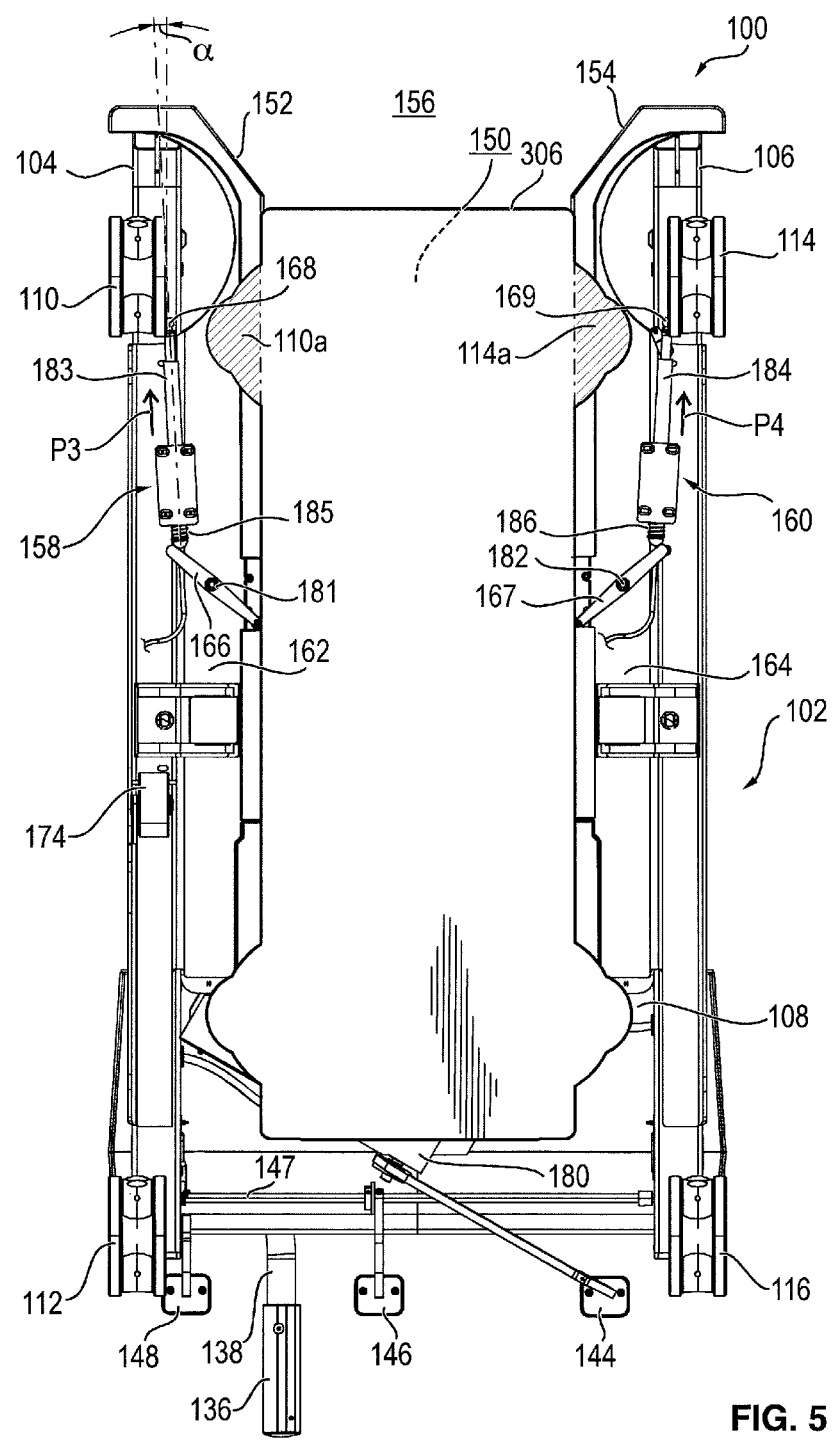
FIG. 5 shows a view of the transport carriage and the operating table column from below.

FIG. 5 shows a view of the transport carriage 100 and the operating table column 302 from below. In this illustration, the hydraulic pump 180 can be seen that is coupled with the foot pedal 144. Further a brake rod 147 for braking the castors 110 to 116 is shown, the possible areas of collision upon inward swiveling of the front castors 110, 114 upon reversal of the movement direction of the transport carriage 100 are illustrated as shaded areas 110a, 11a. Further, the delimiting units 158, 160 including the engaging elements 166, 167, the telescopic rods 183, 184, and the contact elements 168, 169 are shown. Due to the contact of the engaging elements 166, 167 with the telescopic support 308 of the operating table 300 upon movement of the operating table column 302 into the fork-shaped opening 150 of the transport carriage 100, the engaging elements 166, 167 are rotated about their respective rotational axis 181, 182 and push a telescopic guiding rod 183, 184, counteracting a spring force of a spring 185, 186 in direction toward the front castors 110, 114 since the engaging elements 166, 167 contact the rear end of the telescopic rod 183, 184 and moving it in direction of the arrows P3 and P4. Thereby, the contact elements 168, 169 arranged at the front end of the telescopic rods 183, 184 are positioned laterally adjacent to the castors 110, 114, in the orientation of the castors 110, 114 illustrated, such that the castors 110, 114 cannot swivel inward, i.e. not toward the fork-shaped opening 150. Instead, the longitudinal axis of the telescopic rods 183, 184 intersects a perpendicular plane extending through the longitudinal axis of the longitudinal beams 104, 106 at an angle α, whereby the contact elements 168, 169 upon of the telescopic rods 183, 184 in direction of the arrows P3 and P4 press the contact elements 168, 169 obliquely from inside against the inner sides of the castors 110, 114, and at least upon a swiveling and/or rolling movement position them with slight outward inclination by also applying a force component to the castors 110, 114 which acts outwardly. By means of this slight outward inclination, preferably within the range of 0.2° to 6°, in particular from 0.5° to 3.5°, about the swiveling axis of the castors 110, 114, it is achieved that the castors 110. 114, upon reversal of the direction of movement, i.e. upon movement of the transport carriage 100 in direction of the arrow P2, swivel outward instead of inward into the collision areas 110a, 114a such that no collision can occur with the operating table base 306.

Figure 6A:
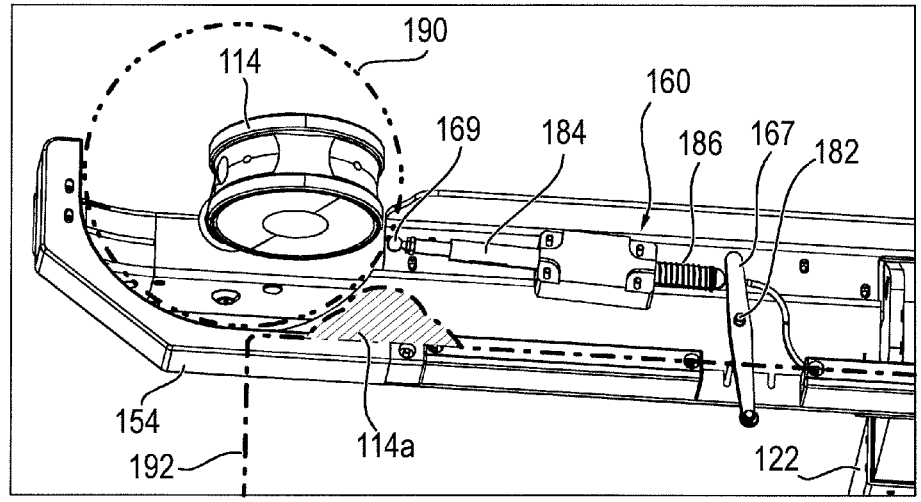
FIG. 6a shows a perspective illustration of a detail of the transport carriage with a castor and with a delimiting unit for delimiting the swiveling movement of the castor, wherein the delimiting unit is shown in a first disabled operational state.

In FIG. 6a, a perspective illustration of a detail of the transport carriage 100 is shown, including the castor 114 and the delimiting unit 160 for delimiting the swiveling movement of the castor 114, wherein the delimiting unit 160 is shown in a first disabled operational state. In said first operational state, the operating table column 302 is not arranged in the range of the transport carriage 100 such that the engaging element 167 has not pushed the telescopic rod 184 in direction toward the castor 114. The swiveling range of the castor 114 is indicated by the dash double dotted line 190, and the perimeter of the operating table base 306 is indicated by means of the dash dotted line 192. The possible overlap area of the swiveling range 190 and the base area of the operating table base 306 is marked by oblique hatching 114a. In this area 114a, a collision with the operating table base 306 is likely to occur upon reversal of the transport carriage's 100 movement direction and inward swiveling of the castor 114 caused thereby.

Figure 6B:
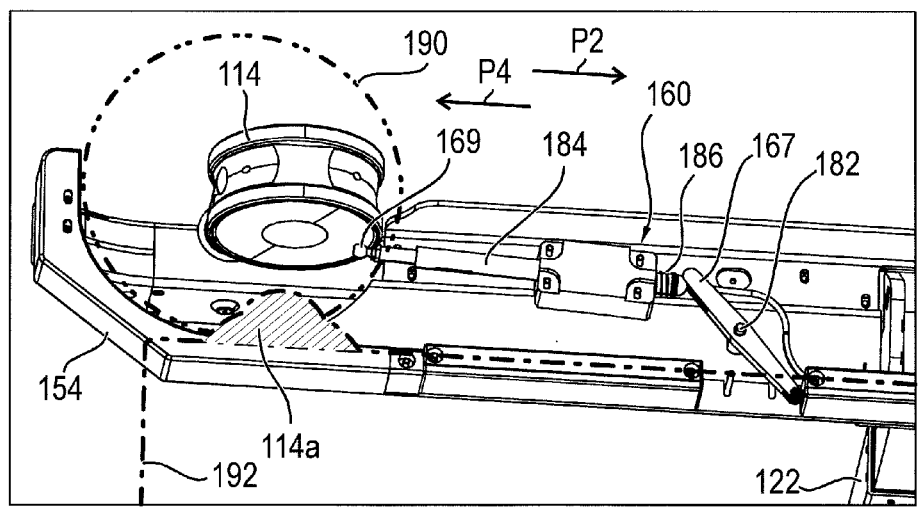
FIG. 6b shows the detail of the transport carriage according to FIG. 6a, wherein the delimiting unit is shown in a second enabled operational state.

In FIG. 6b, the detail of the transport carriage 100 according to FIG. 6a is shown with the delimiting unit 160 being shown in a second enabled operational state. The second operational state is automatically enabled when the transport carriage 100 is moved in direction of the arrow P1 toward the operating table column 302, i.e. from the position shown in FIG. 2 to the position shown in FIG. 3. Thereby, the engaging element 167 is rotated about the rotational axis 182 due to its contact with the telescopic support 308 of the operating table column 302 such that the telescopic rod 184 is moved in the direction of the arrow P4, whereupon the contact element 169 laterally contacts the castor 114 and at least prevents it from swiveling inward, preferably deflects it outward, such that upon a subsequent movement of the transport carriage 100 in direction of the arrow P2, the castor 114 swivels outward for orientation in accordance with the new direction of movement in the direction of the arrow P2.

Figure 7A:
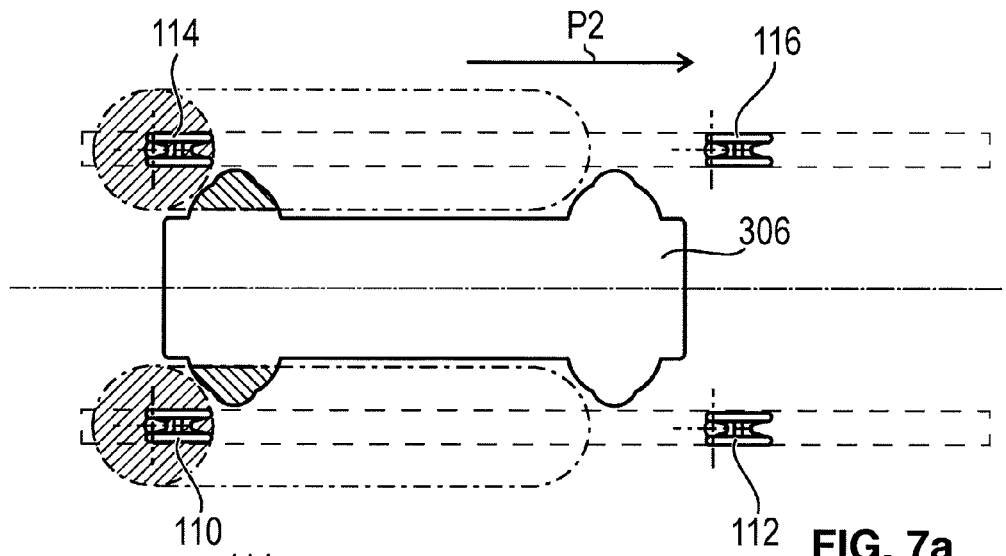
FIG. 7a shows a schematic illustration of a base of an operating table column and of the swiveling area as well as the possible area of collision upon removal of the transport carriage from the operating table column in a first position of the transport carriage relative to the operating table column.
Figure 7B:
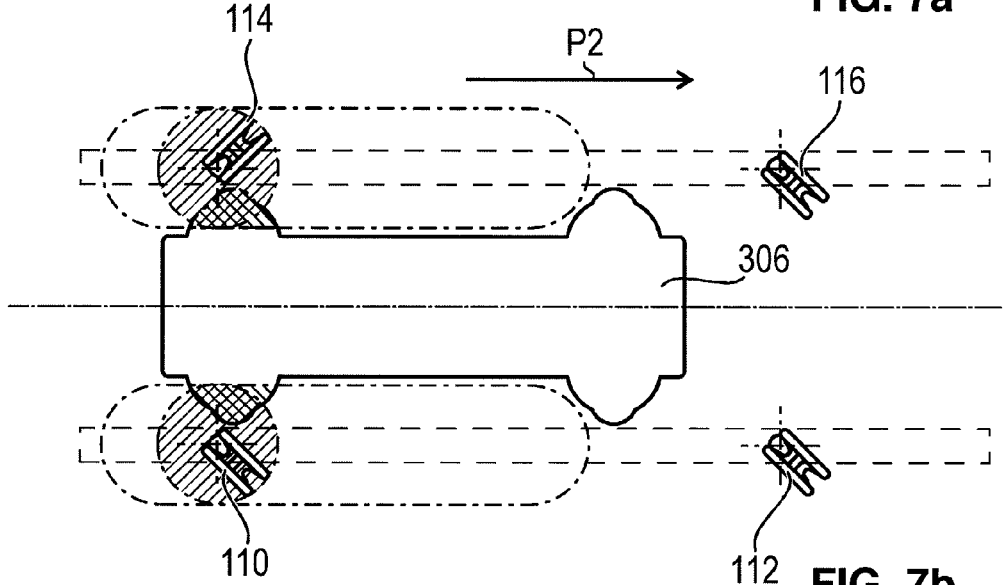
FIG. 7b shows a schematic illustration of a base of an operating table column and of the swiveling area as well as the possible area of collision upon removal of the transport carriage from the operating table column in a second position of the transport carriage relative to the operating table column.
Figure 7C:
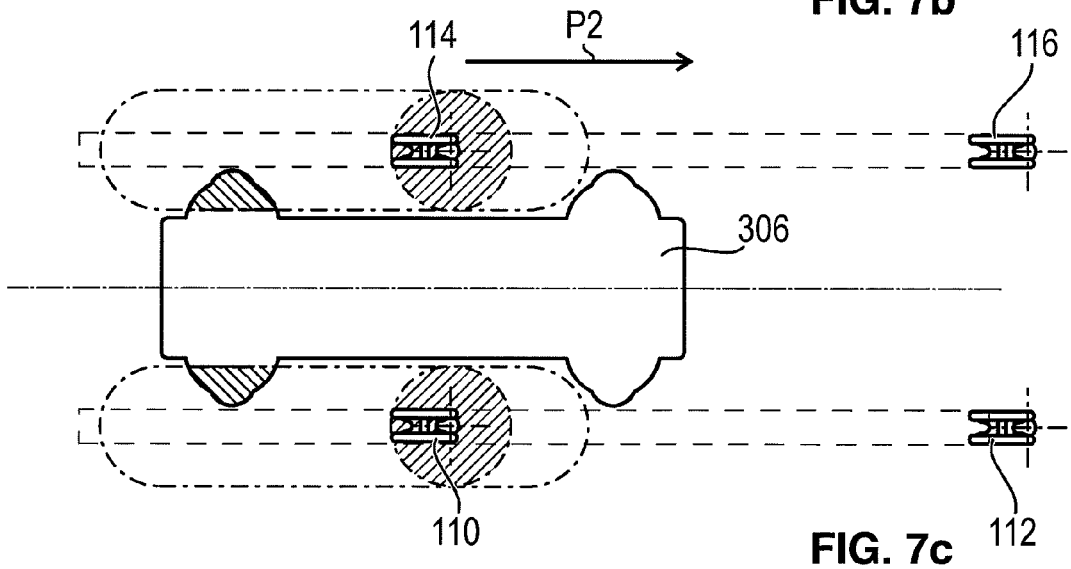
FIG. 7c shows a schematic illustration of a base of an operating table column and of the swiveling area as well as the possible area of collision upon removal of the transport carriage from the operating table column in a third position of the transport carriage relative to the operating table column.

FIG. 7a is a schematic illustration of the operating table base 306 of the operating table column 302 as well as of the swiveling ranges of the castors 110, 114 in a view from below, wherein the swiveling range of the castors 110, 114 in their current positions is shaded. The swiveling range possible upon a reversal of the transport carriage's 100 movement direction in direction of the arrow P2 is outlined by a dashdotted line. By means of the delimiting units 158, 160, inward swiveling of the castors 110, 114 is prevented, as explained above in connection with FIGS. 5, 6a, and 6b, such that the castors can swivel outward only, as shown in FIG. 7b. The rear castors 112, 116 may swivel in any direction, since there is no danger of colliding with the operating table base 306 for these castors. In FIG. 7c, the castors 110, 112, 114, 116 are shown after swiveling caused by the movement in direction of the arrow P2, such that starting from this position, there is no longer the risk of the front castors' 110, 114 colliding with the other projecting elements of the operating table base 306 when the transport carriage 100 is further moved in the direction of arrow P2. If the castors 110, 114, different from what is shown in FIG. 7b, would swivel not outward but inward, they would collide with the operating table base in the overlap area of swiveling range 190 and operating table base 306, such that a further movement of the transport carriage 100 in direction of the arrow P2 would be possible with great effort only.

Figure 8:
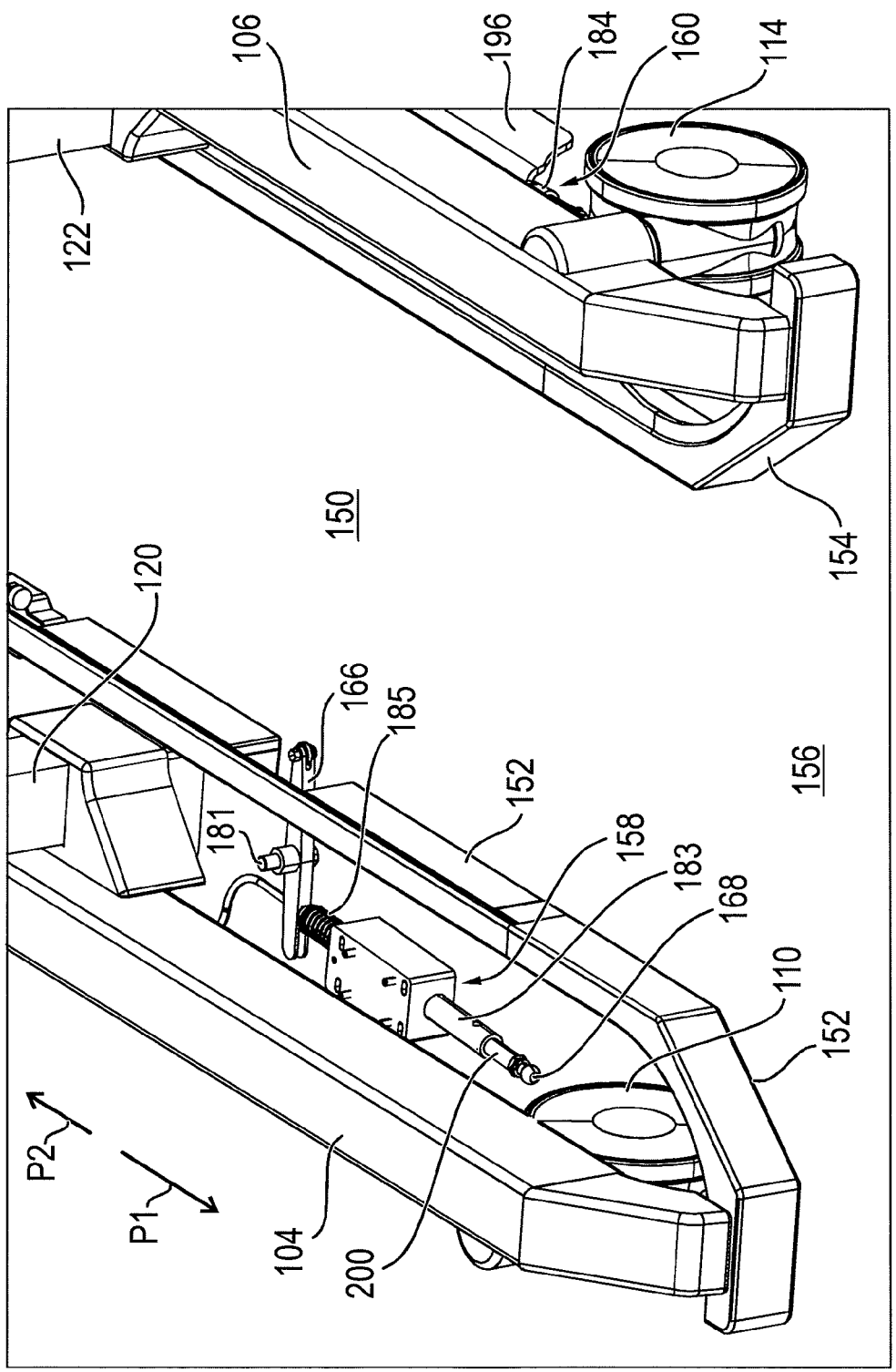
FIG. 8 shows a detail of two longitudinal beams of the transport carriage with the delimiting units shown in a first operational state, wherein elements of the transport carriage have been removed or cut, respectively, for better illustration of the delimiting units.

FIG. 8 shows a detail of the transport carriage 100 with the two longitudinal beams 104, 106 and the delimiting units 158, 160, wherein the delimiting units 158, 160 are shown in the first disabled operational state. For better illustration of the delimiting units 158, 160, the cover plates 162, 164 provided between the longitudinal beams 104, 106 and the guiding elements 152, 154 are not shown, and a lateral cover plate 196 is shown in a cut-away manner. In this first operation condition, the engaging elements 166, 167 are not deflected, since there is no operating table column 302 present in the fork-shaped opening 150. Due to the spring force of the spring 185 of the delimiting unit 158, the telescopic rod 183 has been moved into its release position which it assumes in the first operational state. Thereby, the engaging element 166 has been moved into the initial position shown in FIG. 8. Likewise, the engaging element 167 of the delimiting unit 160 has been moved into the release position it assumes in the first operational state of the delimiting unit 160. In this first operational state of the delimiting units 158, 160 shown in FIG. 8, free swiveling movement of the castors 110, 114 is possible, such that the transport carriage 100 is easily movable in any desired direction, in particular if the guiding roller 174 is lifted and does not contact the floor.

Figure 9:
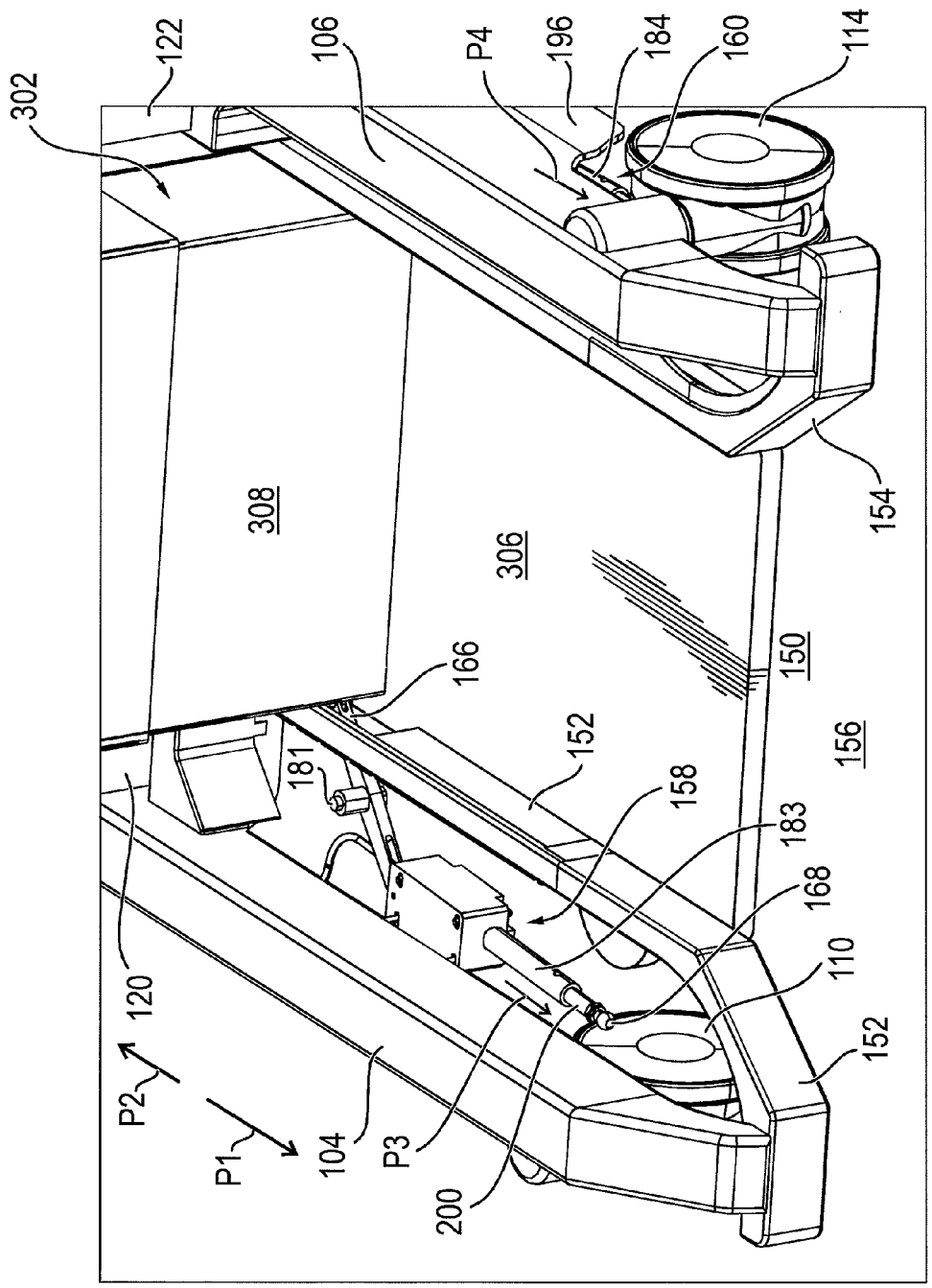
FIG. 9 shows the detail of the transport carriage according to FIG. 7 and a detail of an operating table column arranged in a fork-shaped opening between the longitudinal beams, wherein the delimiting units are shown in a delimiting position in the second operational state.

In FIG. 9, the detail of the transport carriage 100 according to FIG. 8 and of the operating table column 302 positioned in the fork-shaped opening 150 is shown. The operating table column 302 was received in the fork-shaped opening 150 by moving the transport carriage 100 in the direction of the arrow P1, wherein upon movement of the transport carriage 100 in the direction of arrow P1 from the position shown in FIG. 2 to the position shown in FIG. 3, the engaging elements 166, 167 contact the telescopic support 308 of the operating table column 302, such that the engaging elements 166, 167 are rotated about their respective rotational axis 181, 182. Thereby, the telescopic rods 183, 184 are shifted in the direction of the arrows P3 and P4, such that the contact elements 166, 167 arranged at the front end of the telescopic rods 183, 194 are pressed against the inner sides of the castors 110, 114. Thereby, inward swiveling of the castors 110, 114 is prevented in an easy manner, and outward swiveling of the castors 110, 114 occurs when the transport carriage 100 is moved in direction of the arrow P2.

Figure 10:
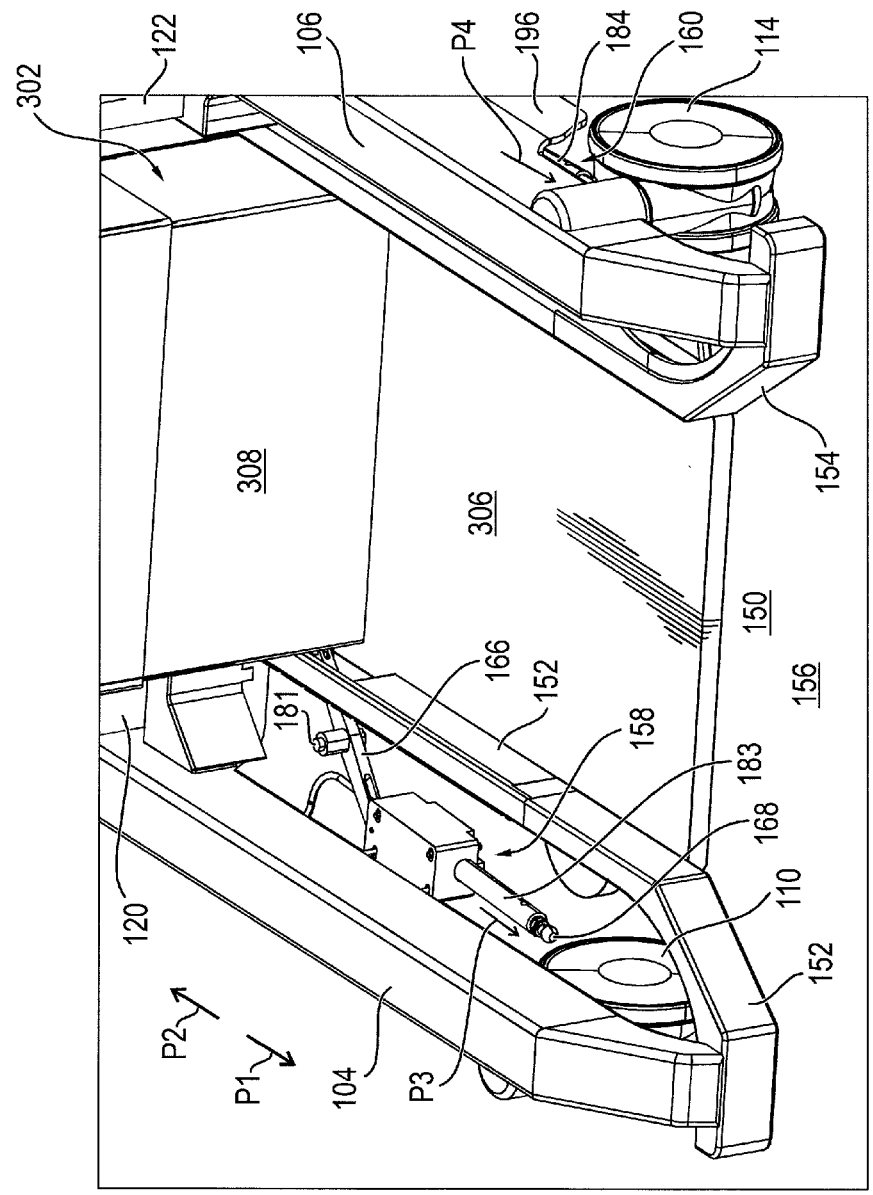
FIG. 10 shows the detail of the transport carriage and the operating table column according to FIG. 9, wherein connecting elements for lifting the operating table column have been set to a position for lifting the operating table column so that the delimiting units are in a release position in the second operational state.

In FIG. 10, a detail of the transport carriage 100 and of the operating table column 302 according to FIG. 9 is shown, wherein the delimiting units 158, 160 are shown in the second operational state. Different from the delimiting position of the contact elements 166, 167 of the delimiting units 158, 160 shown in FIG. 9, the contact elements 166, 167 are shown in a release position in FIG. 10. The contact elements 166, 167 are automatically brought into said release position upon activation of connecting elements 140, 142 for connecting the transport carriage 100 with the operating table column 302. For this purpose, each of the connecting elements 140, 142 is connected with the delimiting unit 158, 160 assigned to the respective connecting element 140, 42 via a Bowden cable. If the connecting elements 140, 142 are brought into an engaging position for engaging the operating table column 302, the core of the Bowden cable is pulled out of the sheath of the Bowden cable in the region of the connecting elements 140, 142. This causes the core of the Bowden wire of the front part of the telescopic rod 183, 184, that is coupled with the front part of the respective telescopic rod 183, 183 to be pulled into the rear part of the cylindrical rod, against an elastically deformable element realized as a helical spring and arranged in the telescopic rod 183, 184, such that the swiveling movement of the castors 110, 114 is released thereby, regardless of the enabled second operational state. Through activation of the connecting elements 140, 142, the operating table column is lifted from the floor when the telescopic support 308 is shortened or when the supports 120, 122 are extended. This way, the castors 110, 114 are outside the collision regions 110a, 114a. Thus, delimiting the swiveling movement of the castors 110, 114 is not necessary when the operating table base 306 has been lifted. On the contrary, it is advantageous that the swiveling movement of the castors 110, 114 is completely released so that the operating table column 302 and, if applicable, a patient support 304 connected with the operating table column and/or the transport carriage 100 can also be moved sideward, i.e. in particular transverse to the movement directions P1 and P2.

In FIG. 11a, a sectional view of the delimiting unit 158 is shown. The delimiting unit 160 is identically constructed, but mirrored arranged. The telescopic rod 183 comprises a rear part 202 having a cylindrical opening into which a front part 200 extends. The front part 200 is connected with the end of the Bowden cable core 204 such that when the Bowden cable core 204 is moved in the direction of the arrow P6 into the Bowden cable sheath 206, the front part 200 of the telescopic rod 183 is pulled in contrast to the spring force of the spring 208, and the distance A1 as well as the total distance B1 of the telescopic rod 183 with the contact element 168 arranged at the front end shrinks, as will be explained in more detail below in connection with FIGS. 13a and 13b. Further, the spring 208 serves as an overload safety device, wherein the spring 208 is compressed when the contact element 168 does not contact the side of the running wheel of the castor 110, 114, but the running face of the running wheel or is prevented from moving by another element. In FIG. 11a, the delimiting unit 158 is shown in the first operational state, wherein neither has the front part 200 been pulled into the cylindrical opening of the rear part 202 by means of the force introduced via the Bowden cable sheath 204, nor has the telescopic rod 183 been moved by means of the engaging element 166 in direction of the arrow P2 in contrast to the spring force of the spring 185 in direction of the arrow P3. In this first operational state, the rear end of the telescopic rod 183 projects backwards from a guiding block 210 by the length designated by C1.

In FIG. 11b, a detail of the transport carriage 100 with the connecting element 140 for connecting the transport carriage 100 with the operating table column 302 is shown in a position in which the connecting elements 140, 142 have not been engaged with the operating table column 302. Hence, the Bowden cable core 204 is not pulled out of the Bowden cable sheath 204 in the region of the connecting element 140, such that the front part 200 has not been pulled into the rear part 202 in contrast to the spring force of the spring 208, and assumes the position shown in FIG. 11a.

In FIG. 12a, a sectional view of the delimiting unit 158 according to FIG. 11a is shown in the second operational state wherein the engaging element 166 has shifted the telescopic rod 183 in the direction of the arrow P3 (see FIG. 10), such that the telescopic rod 183 projects from the guiding block 210 only by the length C2. The lengths B1 and A1 correspond to the lengths of the first operating position according to FIG. 11a. The position of the longitudinal beams 104, 106 shown in FIG. 12a thus is the position of the delimiting unit 158 after positioning the transport carriage 100 about the operating table column 302.

FIG. 12b shows the detail of the transport carriage 100 illustrated in FIG. 11b in unchanged condition, i.e. the connecting elements 140, 142 have not yet been brought into their engaging position for engaging the operating table column 302, such that the front part 200 still has not been moved into the rear part 202 in contrast to the spring force of the spring 208 by means of the Bowden cable.

In FIG. 13a, a sectional view of the delimiting unit 158 according to FIGS. 11a and 12a in the second operational state is shown, wherein the contact element 168 of the delimiting unit 158 has been brought from a delimiting position into a release position. For this purpose, the connecting element 140 has been brought into an engaging position for engaging the operating table column 302 by means of the operating lever 141, as shown in FIG. 13b. For this purpose, the lever 141 has been actuated such that the connecting elements 140 engage complementary engaging elements provided on the operating table column 302 when the telescopic support 308 of the operating table column 302 has been shortened or when the height of the connecting elements 140 has been increased via the height-adjustable perpendicular supports 120, 122. Doing so, the Bowden cable core 204 is pulled out of the Bowden cable sheath 206 as likewise can be taken from FIG. 13b in comparison with FIGS. 11b and 12b. The delimiting unit 158 is still in the second operational state such that the length by which the telescopic rod 183 extends backward from the guiding block 210 is the length C2, like in FIG. 12a. The total length of the telescopic guiding rod has been reduced from length B1 to length B2, and the distance by which the front part 200 projects from the opening of the rear part 202 has been reduced from length A1 to length A1. This way, the delimitation of the swiveling movement of the castor 110, 114 can be easily reversed, even if the delimiting unit 158 is in the second operational state. This particularly makes sense and is possible if the operating table column base 302 is lifted due to the connection between the transport carriage 100 and the operating table column 302 such that, in the lifted condition, there is no risk of collision between the castors 110, 114 and the operating table base 306.

Figure 14:
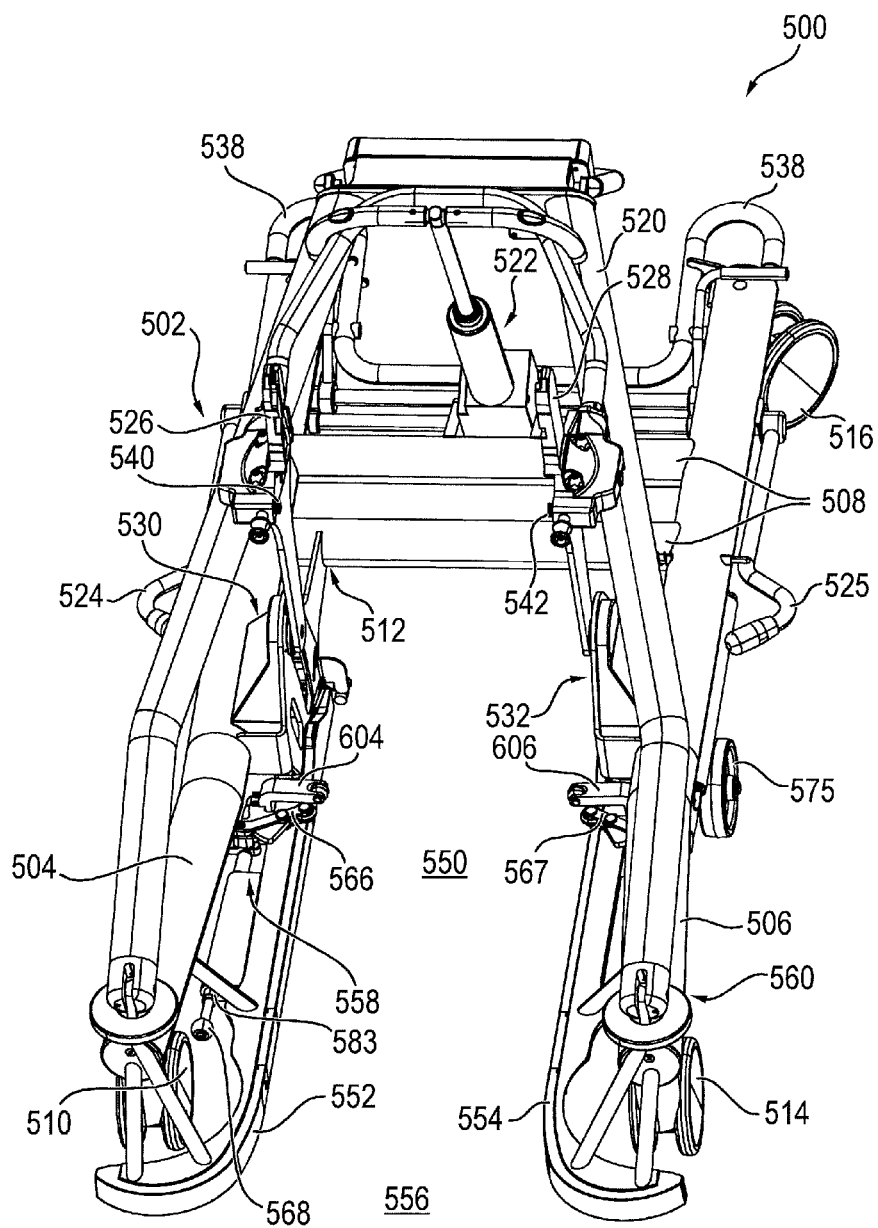
FIG. 14 shows a perspective front view of a transport carriage for transport of an operating table column and/or a patient support of an operating table according to a second embodiment.

In FIG. 14, a perspective front view of a transport carriage 500 for transport of an operating table column and/or a patient support of an operating table according to a second embodiment is shown. The transport carriage 500 comprises a chassis, generally referred to by 502, having a first longitudinal beam 504 and a second longitudinal beam 506 which are arranged at a mutual distance one beside the other in a horizontal plane and define a fork-shaped opening 550. Further, two crossbeams designated by 508 are provided which connect the longitudinal beams 504, 506 with each other in the rear half of the transport carriage 500. Castors 510 to 516 are arranged at the front and rear ends of the longitudinal beams 504, 506. Between the castors 510, 512 and 514, 516 respective lowerable guiding wheels 574, 575 are arranged. The transport carriage 500 comprises a pivoting frame 520 which is pivotably arranged at the front ends of the longitudinal beams 504, 406 and which is pivotable about a pivot axis defined by the pivot points by means of a hydraulic unit 522. The hydraulic unit 522 is pivotable via a hydraulic pump which is actuated by means of foot levers 524, 525. Connecting elements 526, 528 for connecting the transport carriage 500 with a patient support of an operating table are provided at the pivoting frame 520. Further provided is a mechanism for steady alignment of the connecting elements 526, 528 for connecting the transport carriage 500 with the operating table's patient support, and of connecting elements 540, 542 for connecting the transport carriage 500 with an operating table column. These mechanisms for aligning the connecting elements are generally referred to by the reference signs 530, 532. The connecting elements 540, 542 are connected with each other via a coupling element such that the connecting elements 540, 542 are always enabled and disabled together. The transport carriage 500 further comprises a foot actuation element 538 for activating a brake integrated in the castors 510 to 516.

The longitudinal beams 504, 506 are connected with respective guiding elements 552, 554 which are designed to form a cone-shaped opening 556 in the front region of the fork-shaped opening 550, this cone-shaped opening allowing for easy positioning of the transport carriage 500 around a telescopic support of the operating table column.

As described in connection with the first embodiment according to FIGS. 1 to 13, upon swiveling of the castors 510, 514 inward, i.e. toward the fork-shaped opening 550, a collision with the operating table base of a mobile operating table might occur which complicates or even prevents movement of the transport carriage 500, for example after transfer of a patient support of an operating table. In order to avoid this, delimiting units 558, 560 are provided which are constructed similar to the delimiting units 158, 160 according to the first embodiment. In contrast to the delimiting units 158, 160 of the first embodiment, the guiding rods 583, 584 of the delimiting units 558, 560 are, however, not formed as length-adjustable telescopic rods which can be regulated, but as non regulatable guiding rods 583, 584. At the front ends of the guiding rods 583, 584 respective contact elements 568, 569 are arranged so as to be rotatable about the longitudinal axis of the respective guiding rod such that upon contact of the contact element 568 with the castor 510 or contact of the contact element 569, respectively, only rolling friction, but no sliding friction occurs. In FIG. 14, the delimiting unit 558 is shown in a release position. Further details regarding the function of the delimiting units 558, 560 are explained in detail below in connection with the following Figures.

Figure 15:
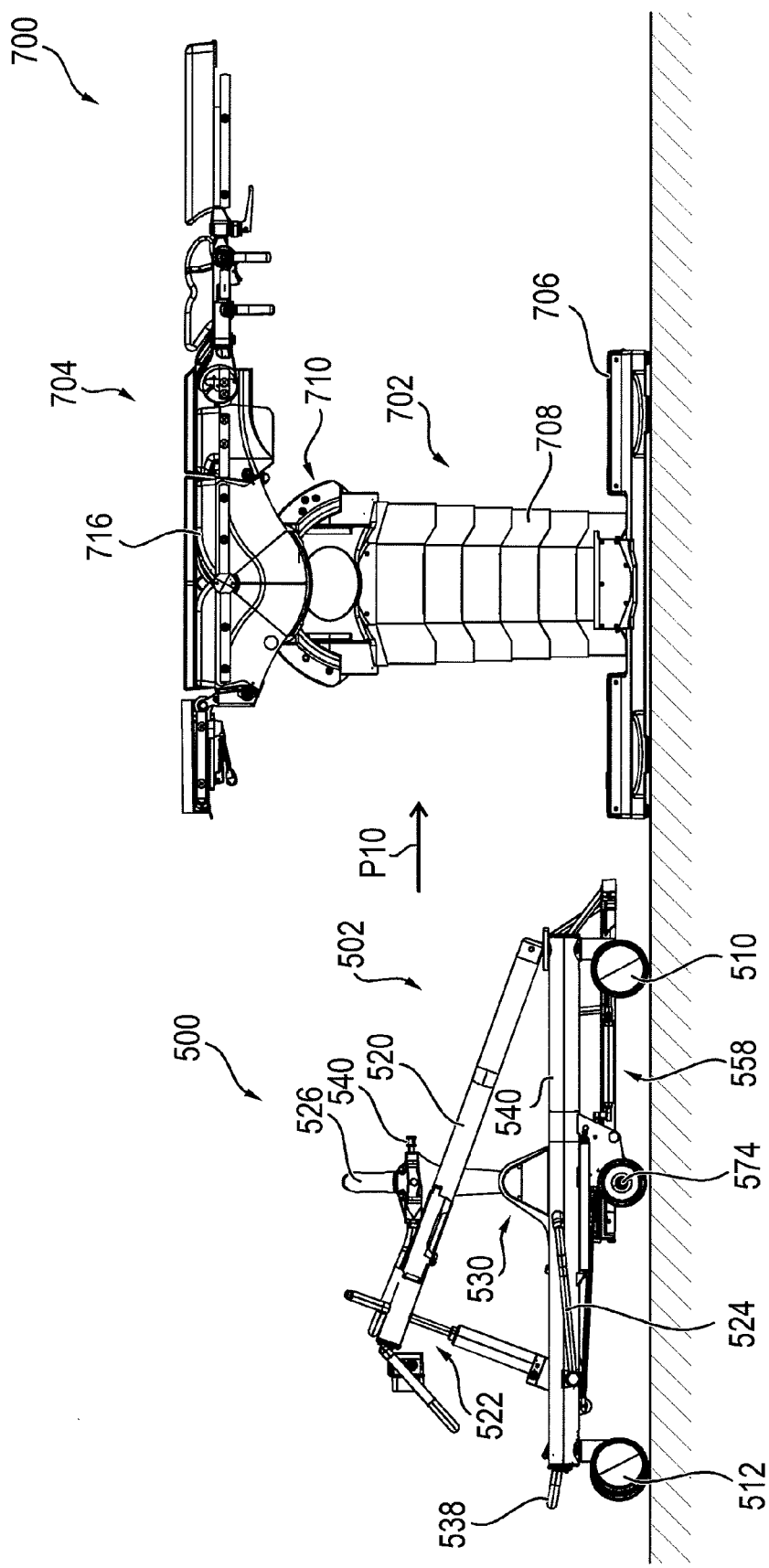
FIG. 15 shows the transport carriage according to FIG. 14 and an operating table prior to transfer of the patient support of the operating table to the transport carriage in a side view.
Figure 16:
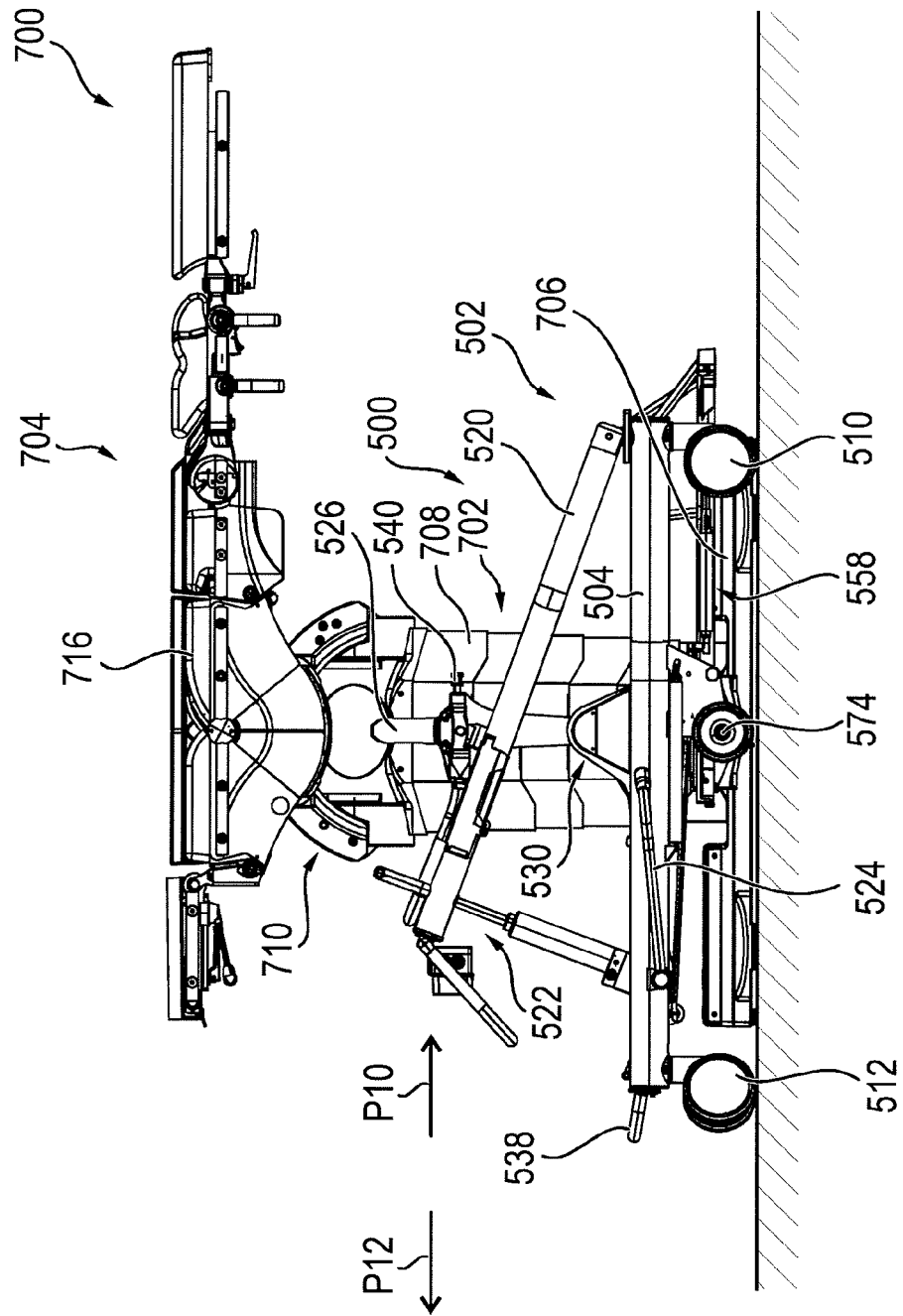
FIG. 16 shows the transport carriage and the operating table according to FIG. 15 in a transfer position.
Figure 17:
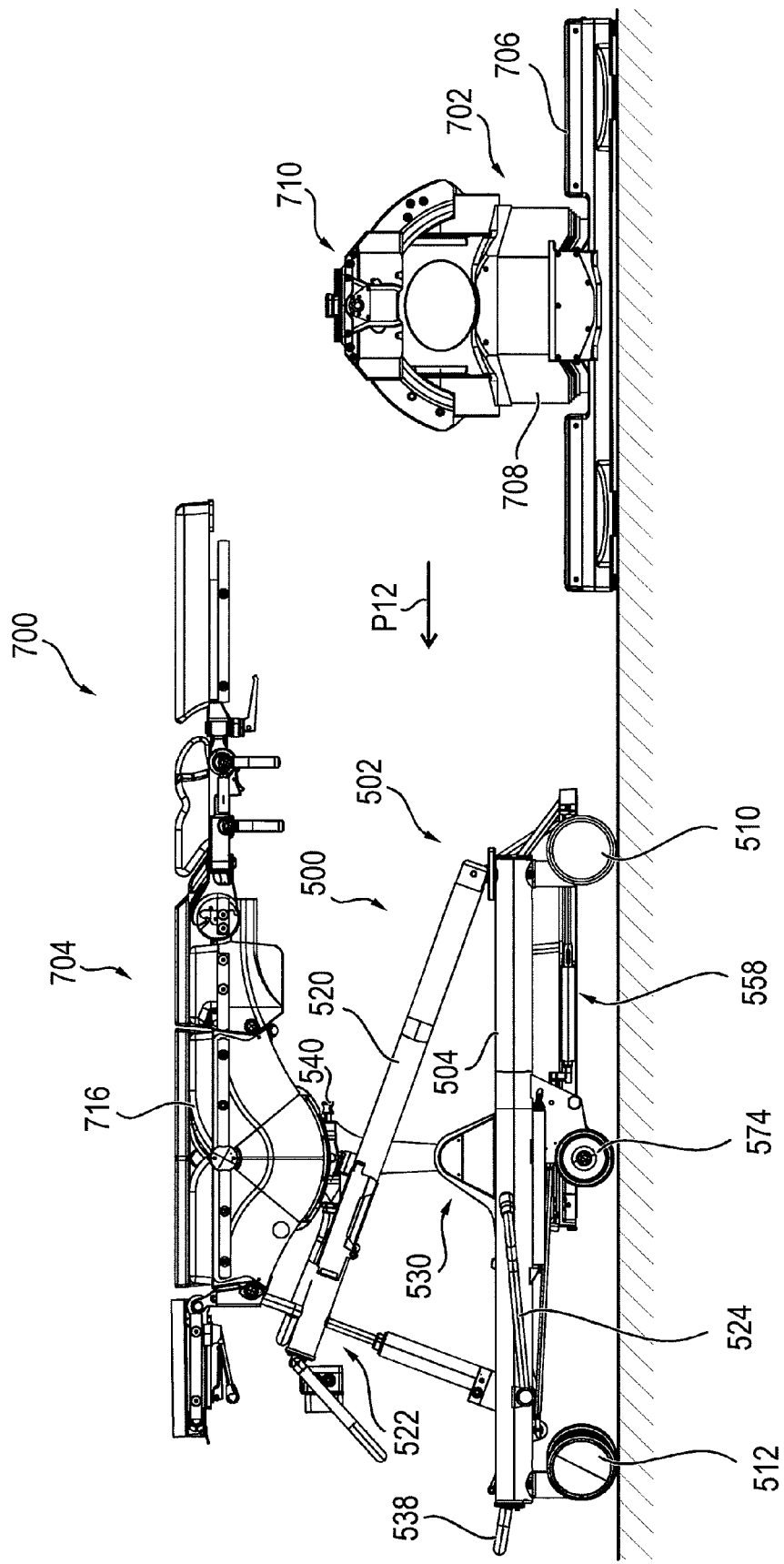
FIG. 17 shows the transport carriage, the operating table column, and the patient support of FIGS. 15 and 16 after transfer of the patient support to the transport carriage.

In FIG. 15, the transport carriage 500 according to FIG. 14 and an operating table 700 prior to transfer of a patient support, generally referred to by 704, of the operating table to the transport carriage 500 are shown in a side view. The operating table 700 further comprises an operating table column 702 having an operating table base 706 and a telescopic support 708 with a head module 710. By means of the head module 710, a central middle section 716 and the other sections of the patient support 704 connected with the central middle section 716 can be varied in their tilt, cant and longitudinal shift. Further, the patient support 704 can be height-adjusted by means of the telescopic support 708. For transfer of the patient support 704, the transport carriage 500 is moved in direction of the arrow P10 such that the operating table column 704 is positioned in the fork-shaped opening 550 of the transport carriage 500, and that thereby the connecting elements 526, 528 are located directly below complementary connecting elements of the patient support 704, as shown in FIG. 16. For transfer, the telescopic support 708 of the operating table 700 is then shortened such that the connecting elements 526, 528 of the transport carriage 500 engage the complementary connecting elements of the patient support 704. Doing so, the connection between the patient support 704 and the operating table head 710 is automatically cut. Subsequently, the transport carriage is removed from the operating table column 702 together with the patient support 704 in direction of the arrow P12, as shown in FIG. 17.

Transfer of the patient support 704 from the transport carriage 500 to the operating table column 702 is effected in reverse order The transport carriage 500 comprises a storage battery for supplying power to at least one drive unit for varying the tilt of the patient support 704 when the latter has been transferred to the transport carriage 500. This is necessary in particular if a patient resting on the patient support 704 must be placed into a shock position. The electrical connection between the patient support 704 and the transport carriage 500 is established via electrical contacts integrated in the connecting elements 526, 528. Control of the drive unit for varying the tilt of the patient support 704 is realized via a not shown remote control connected with the patient support 704 and/or via operating controls provided on the patient support 704 and/or on the transport carriage 500.

Figure 18:
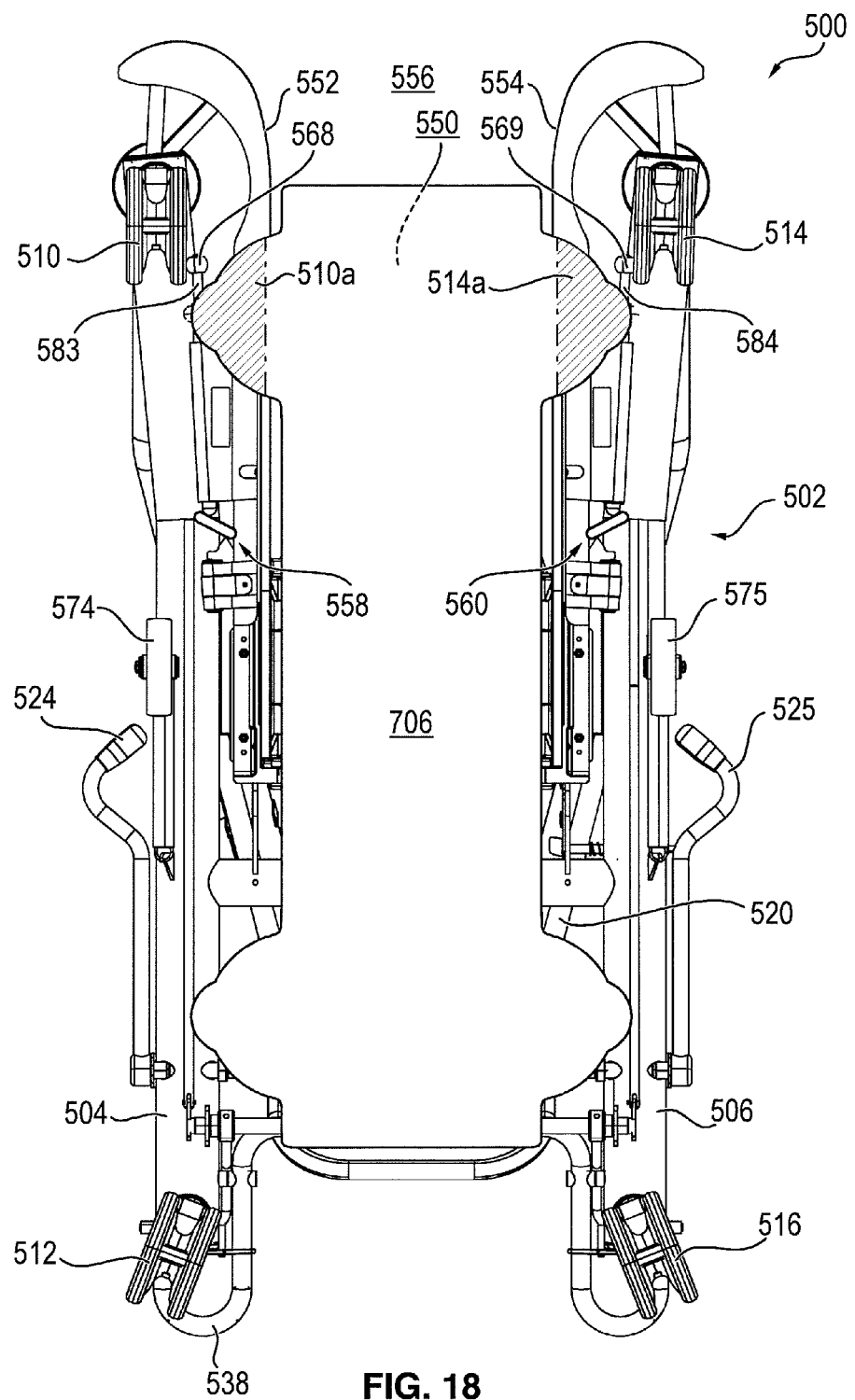
FIG. 18 shows a view of the transport carriage and the operating table column from below.

FIG. 18 shows a view of the transport carriage 500 and the operating table column 702 from below. Possible regions of collision of the front castors 514 with the operating table base 706 are shaded and designated by 510*a* and 514*a*.

Figure 19A:
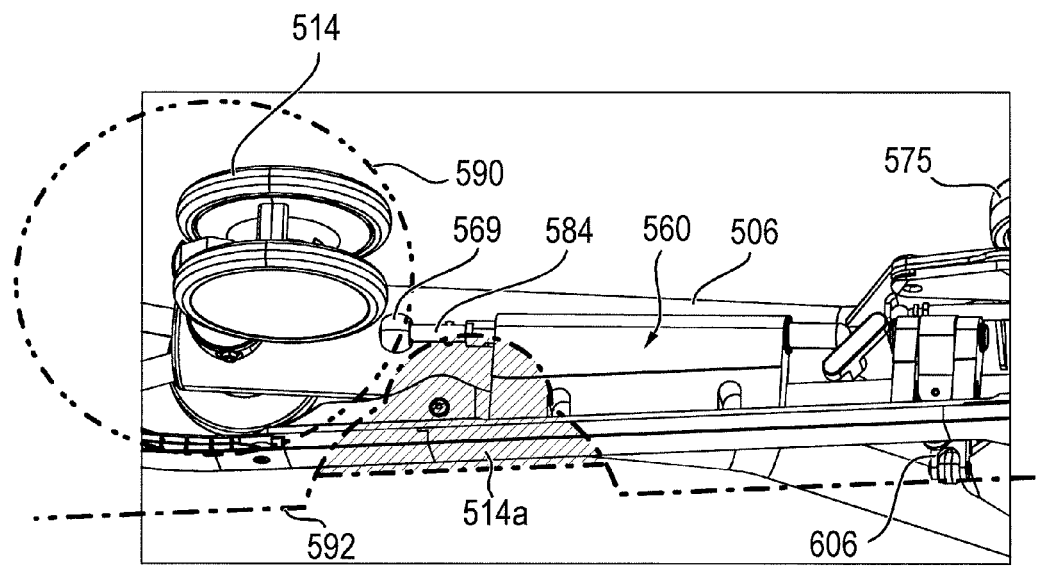
FIG. 19a shows a perspective illustration of a detail of the transport carriage with a castor and with a delimiting unit for delimiting the swiveling movement of the castor, wherein the delimiting unit is shown in a first disabled operational state.
Figure 19B:
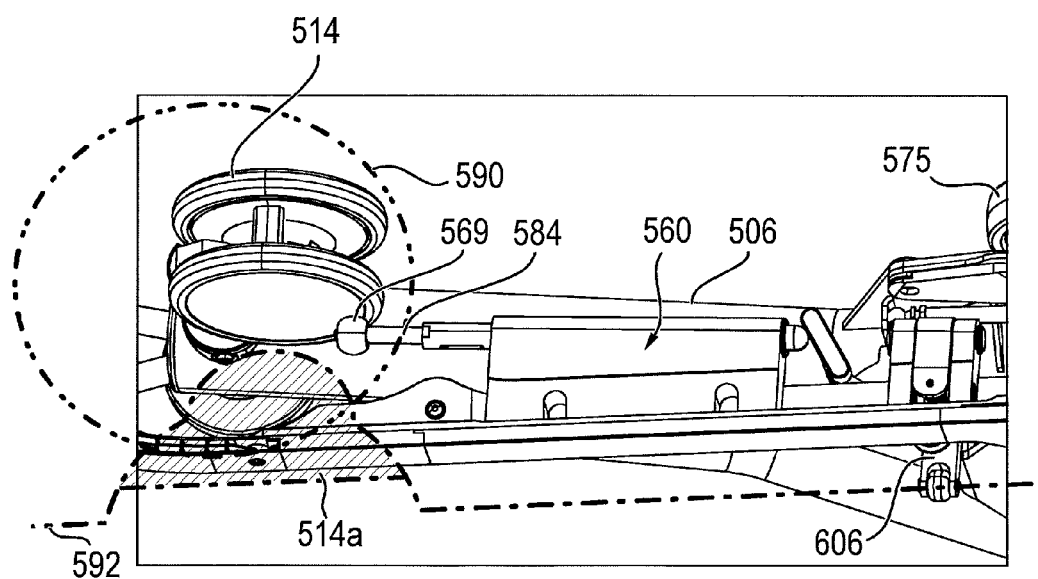
FIG. 19b shows the detail of the transport carriage according to FIG. 19a, wherein the delimiting unit is shown in a second enabled operational state.

FIG. 19*a* shows a perspective view of a detail of the transport carriage 500 including the castor 514. The swiveling range of the castor 514 is indicated by a dash double dotted line 590, and the perimeter of the operating table base 706 is indicated by means of the dash dotted line 592, wherein the shaded area 594 is a possible region of collision between the castor 514 and the operating table base 706. The delimiting unit 560 is shown in a release position in FIG. 19*a*, and in a delimiting position in FIG. 19*b*.

Figure 20:
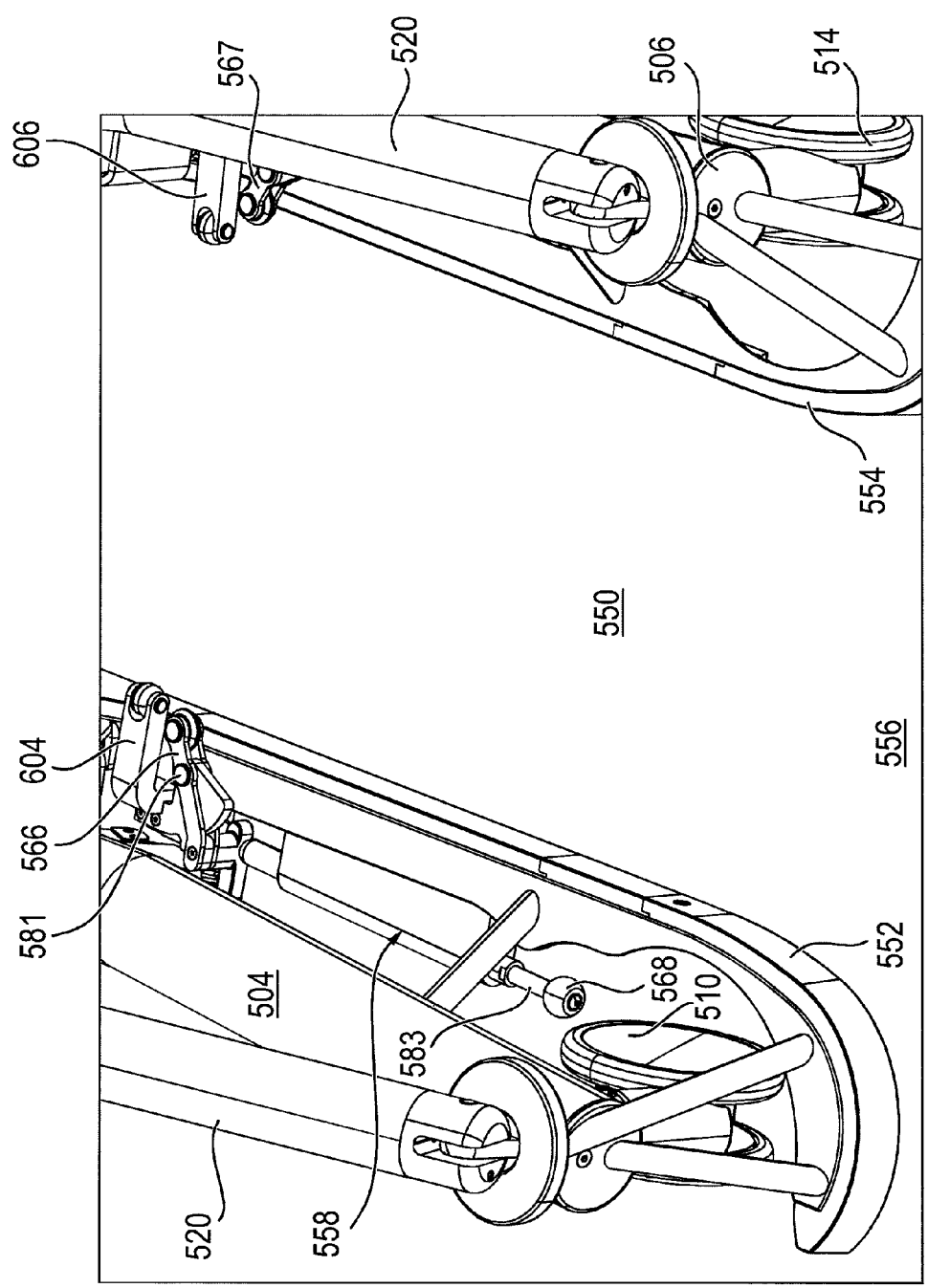
FIG. 20 shows detail of two longitudinal beams of the transport carriage with delimiting units shown in a first operational state.

FIG. 20 shows a detail of the transport carriage 500 with the two longitudinal beams 502, 504, wherein the delimiting units 558, 560 are in a first operational state wherein the contact elements 568, 569 are in a release position in which they do not delimit the swiveling movement of the castor 510, 514.

Figure 21:
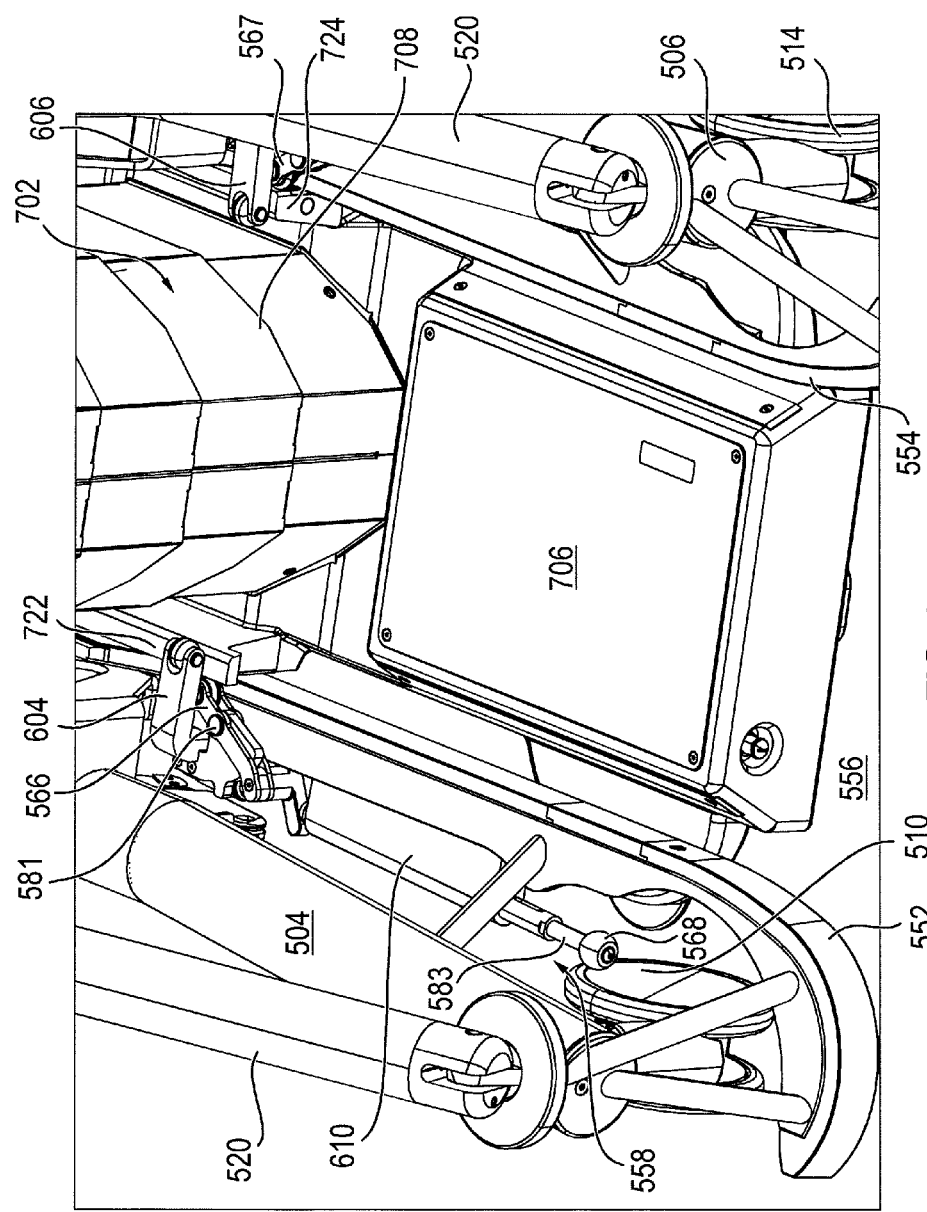
FIG. 21 shows the detail of the transport carriage according to FIG. 20, and a detail of an operating table column arranged in a fork-shaped opening between the longitudinal beams, wherein the delimiting units are shown in a delimiting position in the second operational state.

FIG. 21 shows the detail of the transport carriage according to FIG. 20 and of the operating table column 702 arranged in the fork-shaped opening 550 between the longitudinal beams 504, 506. The delimiting units 558, 560 are shown in a second operational state in which the contact elements 568, 569 are in a delimiting position wherein they delimit the swiveling movement of the castors 510, 514. The guiding rods 583, 584 of the delimiting units 558, 560 have been pivoted about their respective pivot axis 591, 582 due to the contact of a first engaging element 566, 567 with the operating table column 702, whereby the guiding rods 583, 584, together with the contact elements 568, 569 provided at the front ends of the guiding rods 583, 584, are shifted to a delimiting position.

Figure 22:
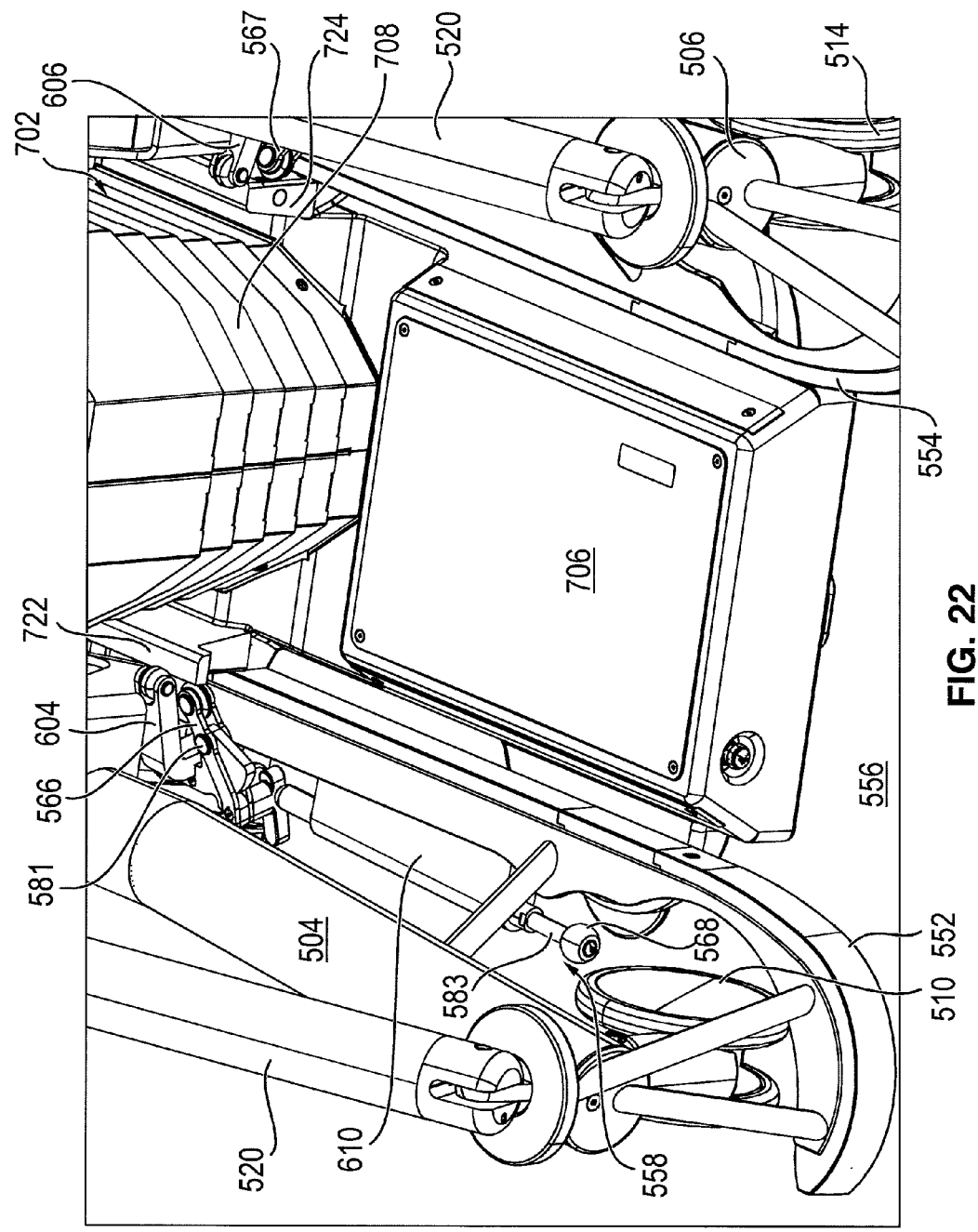
FIG. 22 shows the detail of the transport carriage and the operating table column according to FIG. 21, wherein the delimiting units are shown in the second operational state, and the delimiting units are in a release position due to lifting of the base of the operating table column.

In FIG. 22 a detail of the transport carriage 500 and the operating table column 702 according to FIG. 21 is shown wherein the delimiting units 558, 560 are shown in the second operational state in which the operating table column 702 is located in the fork-shaped opening 550 of the transport carriage 500, and thus in a release position in which they do not delimit the swiveling movement of the castors 510, 514. By lifting the operating table column base 706 a respective projection 722, 724 is brought into engagement with a second engaging element 604, 606 of the delimiting units 558, 560, whereby the engaging elements 604, 606 are pivoted about an pivot axis 610 and, during this pivoting movement, change the position of the respective first engaging element 566, 567 of the respective delimiting unit 558, 560 such that the guiding rods 583, 584, due to the spring force of a spring integrated in the guiding block 610 of the respective delimiting unit 558, 560, are returned to the release position, so that the swiveling movement of the castors 510, 514 is no longer delimited after lifting of the operating table column base 706. This way, the transport carriage 500 is movable in any direction.

The straight lines extending through the cross-sectional center of the longitudinal beams 504, 506 at the swiveling axes of the castors 510, 512 and 514, 516 are considered as the longitudinal axes of the curved longitudinal beams 504, 506. A perpendicular center plane of the transport carriage 500 is defined such that the swiveling axes of the castors 510, 514 as well as the swiveling axes of the castors 512, 516 each have the same horizontal distance to said perpendicular center plane.

Figure 23A:
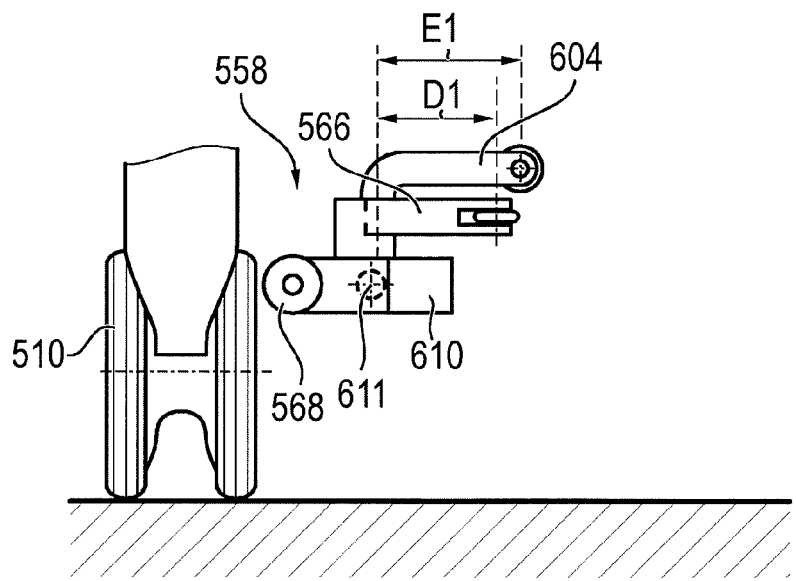
FIG. 23a shows a front view of the delimiting unit in the first operational state.
Figure 23B:
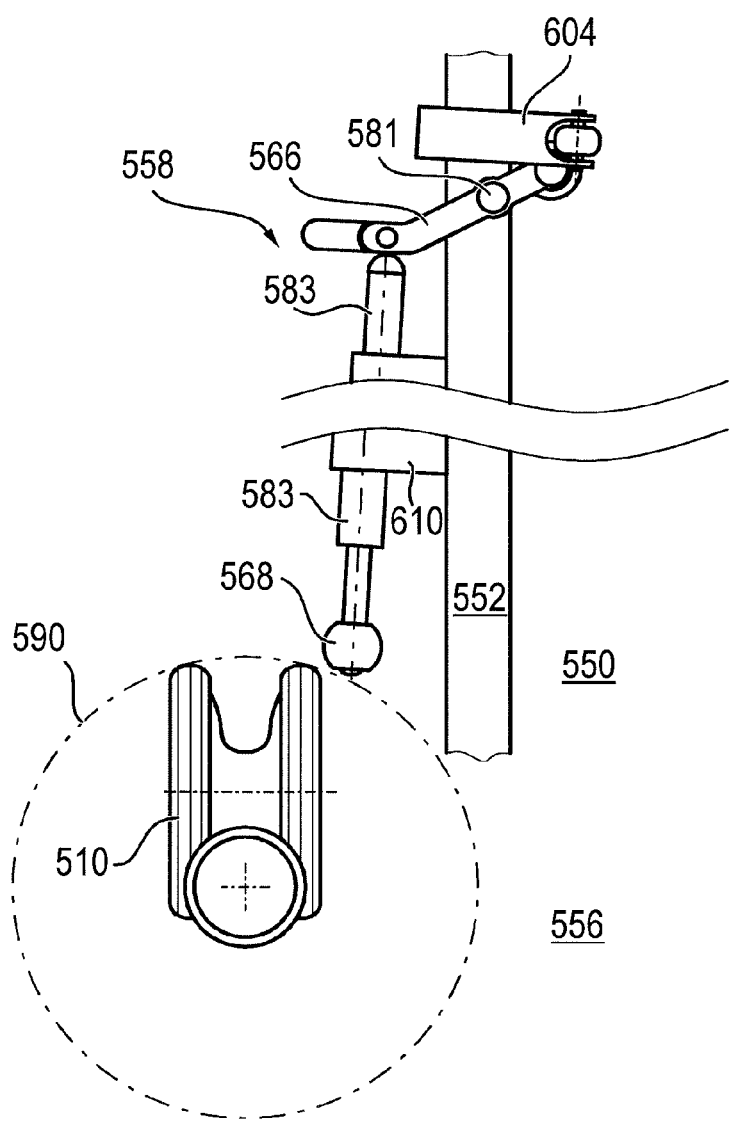
FIG. 23b shows a plan view of the castor, the delimiting unit, and engaging elements for actuating the delimiting unit, in a position in which the engaging elements are not in engagement with an operating table column.

FIG. 23*a* shows a front view of the delimiting unit 558 in the first operational state together with the castor 510. The arrangement consisting of engaging element 566 and engaging element 604 is pivotable about a pivot axis 611 about which it is moved from the position illustrated in FIG. 23*a* when the operating table base 706 is lifted by engagement of the projections 722 of the operating table column 702 with the engaging element 604, such that the first engaging element 566 is rotated about the pivot axis 611 until it is no longer in engagement with the operating table base 706. Thereby, the delimiting unit 558, or its contact element 568, is automatically brought from a delimiting to a release position when the operating table column base is lifted, as will be explained in more detail below in connection with FIGS. 24*a*, 24*b*, 25*a*, and 25*b*. In the illustrations of FIGS. 23*a* and 23*b*, neither the engaging element 566 nor the engaging element 604 is in engagement with the operating table 700, such that the delimiting unit 558 is in the first operational state, i.e. in a release position, in which the contact element 568 does not delimit the swiveling movement of the castor 510.

Figure 24A:
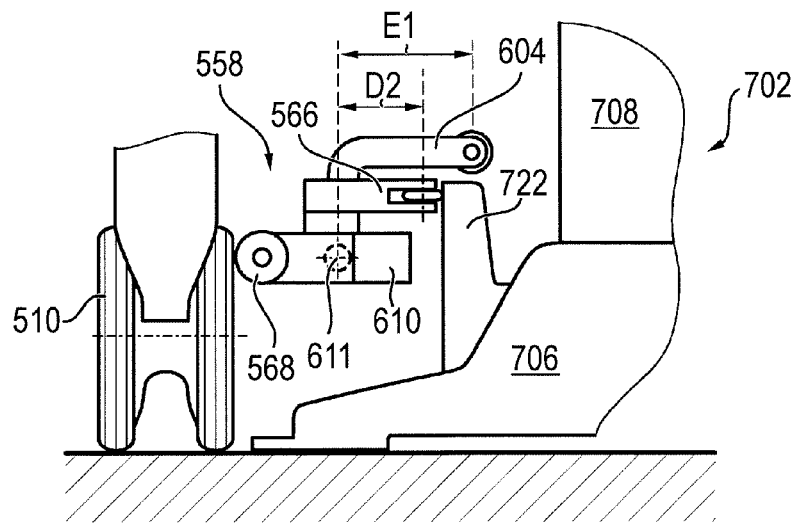
FIG. 24a shows a front view of the delimiting unit according to FIG. 23a and an operating table column in the second operational state in a delimiting position.
Figure 24B:
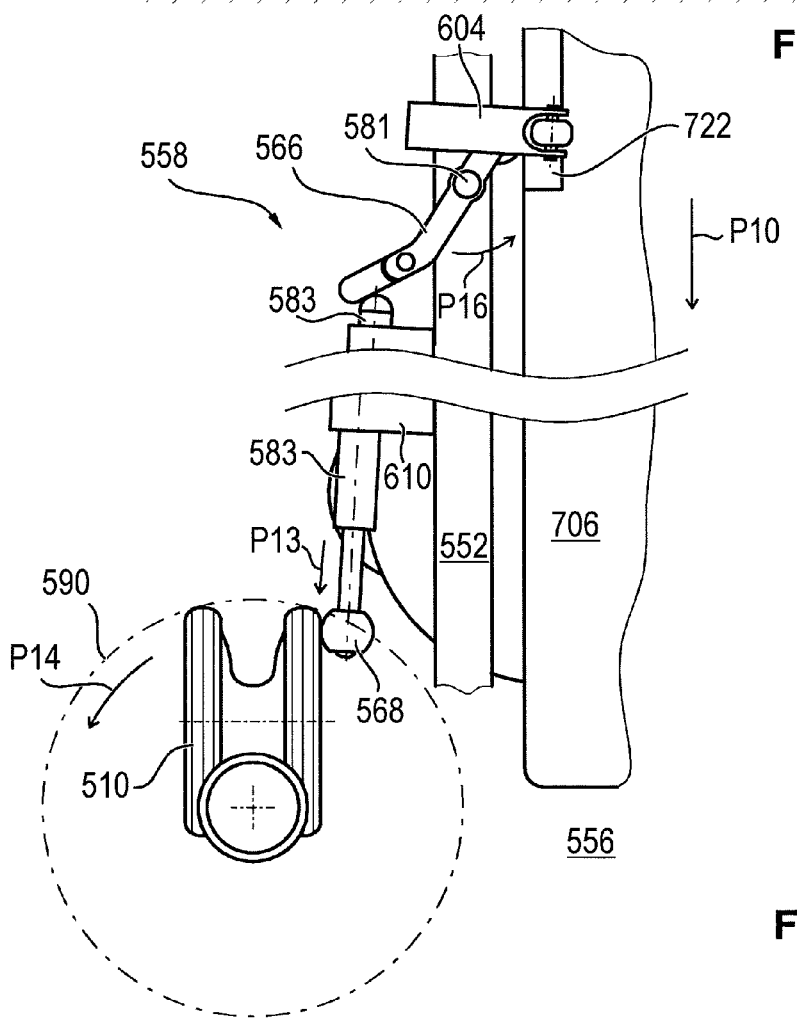
FIG. 24b shows a plan view of the castor, the delimiting unit, and engaging elements for actuating the delimiting unit, in a position in which a first engaging element is in engagement with an operating table column, and a second engaging element is not in engagement with the operating table column.

FIG. 24*a* shows a front view of the arrangement according to FIG. 23*a* in a delimiting position in a second operational state, and FIG. 24*b* shows a plan view of the castor 510 and the delimiting unit 558 in the delimiting position in the second operational state. The first engaging element 566 engages the operating table column 702 and is thereby rotated about the rotational axis 581, whereby the first engaging element 566 moves the guiding rod 583 in direction of the arrow P13, such that the contact element 568 is brought into the swiveling range 590, and the swiveling movement of the castor 510 is delimited thereby. Upon movement of the guiding rod 583 with the contact element 568, a castor 510 oriented by movement of the transport carriage 500 in direction of the arrow P10 is deflected in direction of the arrow P14, preferably by an angle in the range of 0.5° to 5°, in particular by 3°.

Upon contact of the first engaging element 566 with the operating table base 706, the engaging element 566 is pivoted about the rotational axis 581 in direction of the arrow P16. The distance E1 indicated in FIG. 24*a* of the second engaging element 604 from the rotational axis 610 corresponds to the distance E1 according to FIG. 23*a*. The distance D1 of the engaging element 566 according to FIG. 23*a* has been reduced to the distance D2 by engagement of the engaging element 566 with the operation table column 702.

Figure 25A:
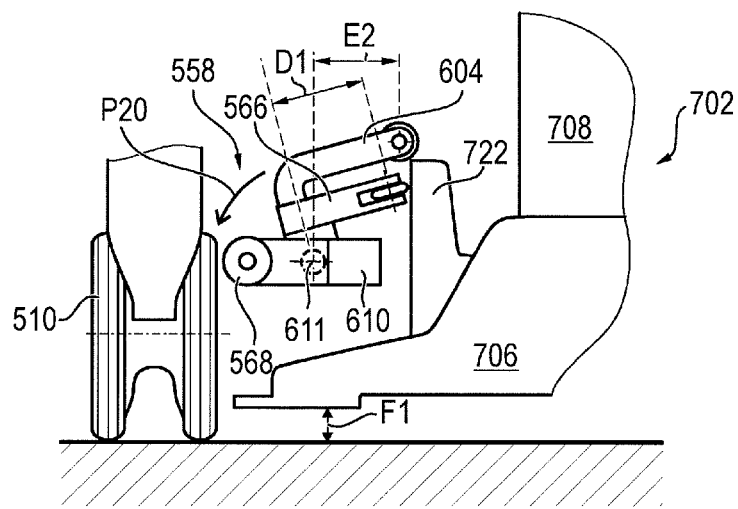
FIG. 25a shows a front view of the delimiting unit according to FIGS. 23a and 24a in the second operational state in a release position.

In FIG. 25*a*, a front view of the delimiting unit 558 according to FIGS. 23*a* and 24*a* is shown in the second operational state in a release position. The base 706 of the operating table 700 has been lifted from the floor by the distance F1. This has been achieved by shortening the telescopic support 708. Due to the lifting, the engaging element 604 has been pivoted about the pivot axis 610 such that the horizontal distance between the pivot axis and the end of the engaging element 604 facing the operating table column 702 reduces to the length E2. By means of the pivoting of the first engaging element 566 caused thereby, it is achieved that said engaging element 566 no longer engages the operating table 702 and no longer applies the force to the guiding rod 583 which is required for pushing the guiding rod 583 into the delimiting position such that the guiding rod is returned and has the effective lateral length D1 between the rotational axis 610 and the contact area of the engaging element 566.

Figure 25B:
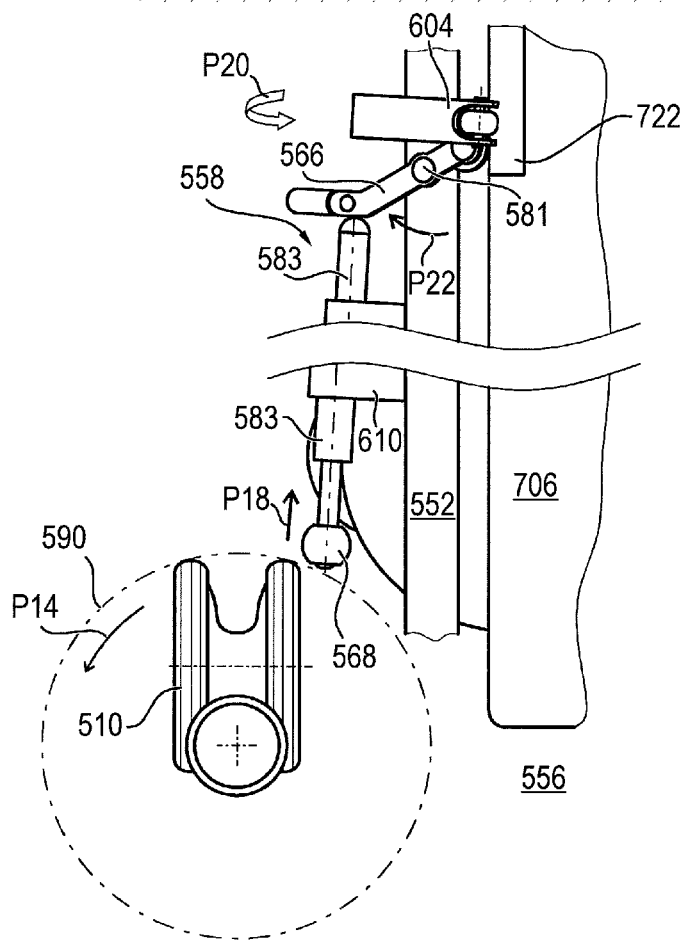
FIG. 25b shows a plan view of the castor, the delimiting unit, and engaging elements for actuating the delimiting unit, in a position in which a first engaging element is not in engagement with an operating table column, and a second engaging element is in engagement with the operating table column.

The pivoting of the engaging elements 566, 604 about the pivot axis 610 causes a movement of the contact element 568 in direction of the arrow P18 based on the effective spring force of the return spring integrated in the delimiting unit 558. In FIG. 25*b*, the pivoting movement of the engaging elements 566, 604 about the pivot axis 610 is indicated by the arrow P20. This pivoting movement causes a pivoting movement of the first engaging element 566 about the pivot axis 581 such that a movement in direction of the arrow P18 from a delimiting position of the contact element 568 in release position shown in FIG. 25*b* occurs.

While the present invention has been illustrated and described with respect to a particular embodiment thereof, it should be appreciated by those of ordinary skill in the art that various modifications to this invention may be made without departing from the spirit and scope of the present.

What is claimed is:

1. A transport carriage for transport of a patient support to or from an operating table column of an operating table, comprising:
   a chassis which is connectable with the patient support or with the operating table column of the operating table, and which comprises a first longitudinal beam and a second longitudinal beam arranged at a distance from each other,
   wherein the first and second longitudinal beams form a fork-shaped opening,
   a first castor pivotable about a swiveling axis, the first castor being arranged at a free end of the first longitudinal beam of the fork-shaped opening,
   a first delimiting unit associated with and connected to the first longitudinal beam, the first delimiting unit delimiting the swiveling movement of the first castor about its swiveling axis,
   wherein the first delimiting unit, in a disabled first operational state, does not delimit the swiveling movement of the first castor, and wherein the first delimiting unit, in an enabled second operational state, does delimit the swiveling movement of the first castor,
   a second castor pivotable about a swiveling axis, the second castor being arranged at a free end of the second longitudinal beam of the fork-shaped opening, and
   a second delimiting unit associated with and connected to the second longitudinal beam, the second delimiting unit delimiting the swiveling movement of the second castor about its swiveling axis,
   wherein the second delimiting unit, in a disabled first operational state, does not delimit the swiveling movement of the second castor, and wherein the second delimiting unit, in an enabled second operational state, does delimit the swiveling movement of the second castor,
   wherein at least one of the delimiting units includes an engaging element having a proximal end within a perimeter defined by the associated longitudinal beam and a distal end outside of the perimeter, the distal end of the engaging element extending generally transversely into the fork-shaped opening such that when a surface of the operating table column contacts and moves the distal end of the engaging element the at least one of the delimiting units is changed from the first operational state to the second operational state.

2. The transport carriage according to claim 1, wherein the first delimiting unit comprises a contact element which is movable between a first position in the first operational state and a second position in the second operational state.

3. The transport carriage according to claim 2, wherein a straight line between the first position and the second position is skewed to the longitudinal axis of the first longitudinal beam, wherein the straight line and the longitudinal axis of the first longitudinal beam in the projection of the plan view of the transport carriage enclose an acute angle ($\alpha$).

4. The transport carriage according to claim 2, wherein the contact element in the second position has a greater lateral distance to a perpendicular plane through which the longitudinal axis of the first longitudinal beam extends, or to a perpendicular center plane of the carriage than in the first position, wherein the center plane extends between the first and second longitudinal beams.

5. The transport carriage according to claim 2, wherein the first delimiting unit comprises a first elastically deformable element which, in the second operational state, applies a force to the contact element or to a guiding element connected with the contact element by which force the contact element is movable into its position assumed in the first operational state.

6. The transport carriage according to claim 5, wherein the first delimiting unit alternatively or in addition to the first elastically deformable element comprises a second elastically deformable element which in the enabled second operational state upon deformation applies a force to the contact element, wherein the contact element in the enabled second operational state is movable from a delimiting position in which the swiveling movement of the first castor is delimited to a release position in which the swiveling movement of the first castor is not delimited, in counteraction to the force caused by the deformation, by an actuating element.

7. The transport carriage according to claim 6, wherein the actuating element is coupled with a connecting element for connecting the transport carriage with the operating table column such that, when the operating table column is connected with the transport carriage, it moves the contact element from the delimiting position to the release position despite the enabled second operational state.

8. The transport carriage according to claim 1, wherein the first delimiting unit comprises a contact element which in the second operational state laterally contacts a running wheel of the first castor or a lateral cover of the running wheel of the first castor for delimiting the swiveling movement of the first castor.

9. The transport carriage according to claim 8, wherein the contact element, after an orientation of the running wheel of the first castor caused by a movement of the transport carriage in direction of the free end of the first longitudinal beam along the longitudinal axis thereof, deflects upon a movement from the first to the second position.

10. A transport carriage for transport of a patient support to and from an operating table column of an operating table, comprising:
a chassis which is connectable with the patient support, and which includes a first longitudinal beam and a second longitudinal beam arranged at a distance from each other,
wherein the first and second longitudinal beams form an opening,
a first castor pivotable about a swiveling axis, the first castor being arranged at a free end of the first longitudinal beam of the opening,
a delimiting unit connected to the first longitudinal beam, the delimiting unit delimiting the swiveling movement of the first castor about its swiveling axis,
wherein the delimiting unit, in a disabled first operational state, does not delimit the swiveling movement of the first castor, and wherein the delimiting unit, in an enabled second operational state, does delimit the swiveling movement of the first castor,
wherein the delimiting unit includes an engaging element having a proximal end within a recess defined by the first longitudinal beam and a distal end disposed outside of the recess, the distal end of the engaging element extending into the opening such that when a surface of the operating table column contacts and moves the distal end of the engaging element the delimiting unit is changed from the first operational state to the second operational state.

11. The transport carriage according to claim 10, wherein the delimiting unit is formed and arranged such that a change from the first operational state to the second operational state occurs through contact of an operating table column arranged between the first and second longitudinal beams with the delimiting unit.

12. The transport carriage according to claim 10, wherein the chassis comprises connecting elements for selectively establishing a connection with the patient support or with the operating table column which are arranged at a distance above the first and second longitudinal beams.

13. The transport carriage according to claim 10, further comprising two further castors connected with the chassis or at least one lowerable non pivotable guiding roller connected with the chassis.

14. The transport carriage according to claim 10, further comprising at least two further castors connected with the chassis or two non pivotable guiding rollers connected with the chassis coupled with a braking unit by which a braking force is applied to the running wheels of the at least two further castors.

15. The transport carriage according to claim 10, wherein the delimiting unit includes a contact element which is movable between a first position in the first operational state and a second position in the second operational state.

16. The transport carriage according to claim 15, wherein a straight line between the first position and the second position is skewed to the longitudinal axis of the first longitudinal beam, wherein the straight line and the longitudinal axis of the first longitudinal beam in the projection of the plan view of the transport carriage enclose an acute angle ($\alpha$).

17. A transport carriage for transport of a patient support to and from an operating table column of an operating table, comprising:
a chassis which is connectable with the patient support, and which includes a first longitudinal beam and a second longitudinal beam arranged at a distance from each other,
wherein the first and second longitudinal beams form an opening,
a first castor pivotable about a swiveling axis, the first castor being arranged at a free end of the first longitudinal beam of the opening,
a delimiting unit connected to the first longitudinal beam, the delimiting unit delimiting the swiveling movement of the first castor about its swiveling axis, wherein the delimiting unit, in a disabled first operational state, does not delimit the swiveling movement of the first castor, and wherein the delimiting unit, in an enabled second operational state, does delimit the swiveling movement of the first castor, and wherein the delimiting unit includes an engaging element having a proximal end connected to the first longitudinal beam and a distal end, the distal end of the engaging element extending into the opening such that when a surface of the operating table column or a surface of a projection of an operating table column base contacts and moves the distal end of the engaging element the delimiting unit is changed from the first operational state to the second operational state.

18. The transport carriage according to claim 17, wherein the delimiting unit includes a contact element which is movable between a first position in the first operational state and a second position in the second operational state.

19. The transport carriage according to claim 18, wherein a straight line between the first position and the second position is skewed to the longitudinal axis of the first longitudinal beam, wherein the straight line and the longitudinal axis of the first longitudinal beam in the projection of the plan view of the transport carriage enclose an acute angle ($\alpha$).

20. The transport carriage according to claim 17, further comprising at least one lowerable non pivotable guiding roller connected with the chassis.

* * * * *